(12) United States Patent
Kokami

(10) Patent No.: US 10,765,942 B2
(45) Date of Patent: Sep. 8, 2020

(54) INFORMATION PROCESSING APPARATUS, SERVER DEVICE, AND PROGRAM

(71) Applicant: KONAMI DIGITAL ENTERTAINMENT CO., LTD., Tokyo (JP)

(72) Inventor: Kensuke Kokami, Tokyo (JP)

(73) Assignee: KONAMI DIGITAL ENTERTAINMENT CO., LTD., Tokyo (JP)

( * ) Notice: Subject to any disclaimer, the term of this patent is extended or adjusted under 35 U.S.C. 154(b) by 0 days.

(21) Appl. No.: 16/170,204

(22) Filed: Oct. 25, 2018

(65) Prior Publication Data

US 2019/0060749 A1 Feb. 28, 2019

Related U.S. Application Data

(63) Continuation of application No. PCT/JP2017/016742, filed on Apr. 27, 2017.

(30) Foreign Application Priority Data

Apr. 28, 2016 (JP) .................................. 2016-092028

(51) Int. Cl.
*A63F 13/35* (2014.01)
*A63F 13/533* (2014.01)
(Continued)

(52) U.S. Cl.
CPC ............ *A63F 13/35* (2014.09); *A63F 13/533* (2014.09); *A63F 13/63* (2014.09); *A63F 13/79* (2014.09);
(Continued)

(58) Field of Classification Search
CPC ....................................................... A63F 9/24
See application file for complete search history.

(56) References Cited

U.S. PATENT DOCUMENTS

| 7,828,661 B1* | 11/2010 | Fish | A63F 13/87 |
| | | | 463/42 |
| 2013/0084969 A1* | 4/2013 | Knoles | A63F 13/798 |
| | | | 463/29 |

FOREIGN PATENT DOCUMENTS

| JP | 2013-101594 A | 5/2013 |
| JP | 2015-188503 A | 11/2015 |

OTHER PUBLICATIONS

"Deck Recipe de Deck o Kochiku shiyo!—News—Hearthstone", Mar. 8, 2016, Blizzard Entertainment, Inc., us.battle.net, <URL: https://us.battle.net/hearthstone/ja/blog/20056279/> (6 pages total).

(Continued)

*Primary Examiner* — Reginald A Renwick
(74) *Attorney, Agent, or Firm* — Sughrue Mion, PLLC

(57) ABSTRACT

A server device includes: a set information acquisitor, a first storage, a set information request receiver, and an output controller. The set information acquisitor is configured to acquire from a first terminal device a set information which indicates a set of objects and which is associated with a first user. The first terminal device is configured to process a game by using the set information and to proceed with reference to the set of objects extracted from the set information. The set information request receiver is configured to receive an output request related to the set information from a second terminal device corresponding to a second user. The output controller is configured to cause, on the basis of the set information stored in the first storage, an output device to output at least one of the set information corresponding to the output request and information related to the set information.

6 Claims, 21 Drawing Sheets

(51) Int. Cl.
A63F 13/63 (2014.01)
A63F 13/80 (2014.01)
A63F 13/79 (2014.01)
G06F 3/0481 (2013.01)
G06F 3/0484 (2013.01)

(52) U.S. Cl.
CPC ............ *A63F 13/80* (2014.09); *G06F 3/0481* (2013.01); *G06F 3/0484* (2013.01)

(56) References Cited

OTHER PUBLICATIONS

"Rank-Sen Deck Toko—Hearthstone Deck Kensaku | HearthGamers", Feb. 16, 2016, HearthGamers, hearthgamers.com, <IJRL: http://hearthgamers.com/deck_post> (6 pages total).

"'Duels X Machina'—'Duels X Machina Now' nite Deck Sakusei ga Kano ni. Deck Toko no Tsukaikata o Kaisetsu!", Mar. 30, 2017, Seesaa Inc., BoomAppGames, <URL: https://duelsx.g.boom-app.com/entry/duelsx-deck build> (4 pages total).

International Search Report, issued by International Searching Authority in corresponding International Application No. PCT/JP2017/016742, dated Jul. 18, 2017.

Written Opinion issued by the International Bureau in corresponding International Application No. PCT/JP2017/016742, dated Jul. 18, 2017.

\* cited by examiner

FIG. 5

| CARD ID | CARD NAME | CARD TYPE | LEVEL | OFFENSIVE POWER | DEFENSIVE POWER | CARD TEXT | EFFECT | VERSION | IMAGE |
|---|---|---|---|---|---|---|---|---|---|
| aaaaaa | MONSTER A | MONSTER | 8 | 5000 | 3000 | OOOO... | NONE | 3 | aaaaaa.jpg |
| bbbbbb | MONSTER B | MONSTER | 4 | 2000 | 100 | OOOO... | EFFECT P | 4 | bbbbbb.jpg |
| cccccc | MAGIC C | MAGIC | - | - | - | OOOO... | EFFECT X | 4 | cccccc.jpg |

FIG. 6

| FRAME ID | CARD ID |
|---|---|
| MAIN 01 | aaaaa |
| MAIN 02 | ccccccc |
| ... | ... |
| SIDE 01 | ttttttt |
| SIDE 02 | ttttttt |
| ... | ... |

FIG. 7

| POST ID | POSTER ID | POSTING DATE AND TIME | DECK NAME | CATEGORY | EVALUATION pt | BLOCKED NUMBER |
|---|---|---|---|---|---|---|
| 1234567 | ABABAB | ymdhms | DECK A | CATEGORY A | 3040 | 29 |
| 1234568 | BBBVVV | ymdhms | DECK G | CATEGORY B | 400 | 2 |

FIG. 8

| USER ID | 000000001 |
|---|---|
| PLAYER LEVEL | 35 |
| GAME CURRENCY A | 50000 ZENY |
| GAME CURRENCY B | 1500 ITEMS |
| BILLING AMOUNT OF THIS MONTH | 3000JPY |
| AGE AUTHENTICATION | 18 OR OVER |

INFORMATION PROCESSING APPARATUS, SERVER DEVICE, AND PROGRAM

TECHNICAL FIELD

The present invention relates to an information processing apparatus, a server device, and a non-transitory computer readable storage medium that stores a computer program.

BACKGROUND ART

There are card games (trading card games) that proceed by users owning, as hands, several cards from sets (for example, a so-called deck or the like) of objects (cards) prepared in advance by creating arbitrary combinations and executing commands of arranging cards at places that are called boards from among hands and the like. Conventionally, the users manipulate progression of the games by a method of selecting cards and executing commands by performing operations (for example, dragging and dropping operations or choosing of displayed options) for the selected cards in such card games (for example, see Patent Literature 1).

CITATION LIST

Patent Literature

[Patent Literature 1]
Japanese Unexamined Patent Application, First Publication No. 2015-188503

SUMMARY OF INVENTION

Technical Problem

Incidentally, according to games as described above, it is possible to cause the games to have a property of being highly strategic since the sets of objects are arbitrarily selected by the users. However, there are cases in which it is difficult for beginners in the games to determine how to construct sets of objects. In addition, since there are a very large number of types of combination of objects if the number of objects for constructing a set is large or if there are a variety of types of object, it may also be difficult for persons who have experience in the games to prepare sets of objects from a state with completely no guidance in some cases.

Thus, the game users have released information about sets of objects on websites and have exchanged information with other users. However, media on the websites and the like may not have direct relevance to a game. Therefore, it may be necessary for the users to select objects with their own hands and to construct sets of objects in an actual game even if the user desires to reflect sets of objects that other users propose in the games. Therefore, there are cases in which it is difficult to use the sets of objects that other users propose.

In addition, game operators have proposed combinations of objects in the games to the users. However, there are also cases in which the types of sets of objects are limited and demands of the users cannot be sufficiently satisfied merely by proposals from the game operators. Also, since the sets of objects that the game operators provide are limited, organizing mechanisms for retrieving sets of objects may not have been considered. Therefore, it is conceivable that users may not be able find desired sets of objects and are brought into situations in which it is difficult to utilize the proposed sets of objects even if it is possible for the game operators to propose a sufficient amount of sets of objects.

As described above, it is desirable to utilize sets of objects that other persons propose.

One of objects of some aspects of the present invention is to provide an information processing apparatus, a server device, and a program capable of easily utilizing sets of objects in games that other persons provide.

One of objects of other aspects of the present invention is to provide an information processing apparatus, a server device, and a program capable of achieving effects and advantages described in embodiments described below.

Solution to Problem

In order to achieve the aforementioned objects, according to an aspect of the present invention, there is provided a server device including: a set information acquisitor that acquires set information that indicates a set of objects and that is associated with a first user from a first terminal device that performs processing of causing a game, which uses the set information and proceeds with reference to the objects extracted from the set information, to be executed; a first storage that stores the set information that the set information acquisitor has acquired; a set information request receiver that receives an output request related to the set information from a second terminal device corresponding to a second user; and an output controller that causes the set information corresponding to the output request and/or information related to the set information to be output on the basis of the set information stored in the first storage.

In addition, according to an aspect of the present invention, there is provided an information processing apparatus including: a game executer that performs control for causing a game that uses set information indicating a set of objects and proceeds with reference to the objects extracted from the set information to be executed; a set information editor that causes the set information that is available for the game executer to be edited; a set information transmitter that transmits information related to the set information that the set information editor has edited to a server device; and an output request transmitter that transmits an output request related to the set information to the server device.

In addition, according to an aspect of the present invention, there is provided a program that causes a computer to function as the aforementioned server device or the information processing apparatus.

BRIEF DESCRIPTION OF DRAWINGS

FIG. 5 is a diagram illustrating an example of card attribute information according to the embodiment.

FIG. 6 is a diagram illustrating an example of deck information according to the embodiment.

FIG. 7 is a diagram illustrating an example of posted information according to the embodiment.

FIG. 8 is a diagram illustrating an example of player information according to the embodiment.

DESCRIPTION OF EMBODIMENTS

Hereinafter, an embodiment of the present invention will be described with reference to the drawings.

First Embodiment

Outline of First Embodiment

A first embodiment of the present invention will be described.

A game system 1 is an information processing system that performs control for executing a game. In the embodiment, a case in which the game system 1 performs control for executing a computer game that reproduces a so-called competition-type trading card game will be described as an example. Also, the game system 1 is a system that manages a deck that is used in the game.

The deck is a set of cards and is used for competitions or the like, which will be described later. It is also possible to state that the deck is a combination of cards, a pack of cards, a group of cards (gathering, unity) or the like. Each user constructs a deck by selecting and combining cards to be used for playing a game from among objects that the user himself/herself owns, in accordance with predetermined regulations (provisions).

The regulations are provisions (restrictions) for constructing a deck. Any deck that does not satisfy (adapt, meet) the regulations cannot be used to play the game. The regulations decide the number of cards that construct a deck, card versions, card types, and the like, for example. Therefore, each user may arbitrarily decide the number of cards, card versions, card types, and the like within ranges defined by the regulations.

The cards are an example of objects. The objects are visible units in terms of display, and for example, units that each user can select. Also, the objects may be owned by each user, for example. In addition, the objects are units that construct each deck, for example. In addition, the objects are used for competitions, for example. In addition, the objects may be medals, figures, characters, and the like rather than cards.

The game according to the embodiment proceeds by each user in a competition using cards extracted from the deck in his/her moves (hereinafter, also referred to as turns). An outline of progression of the game will be described later.

Figure 1:
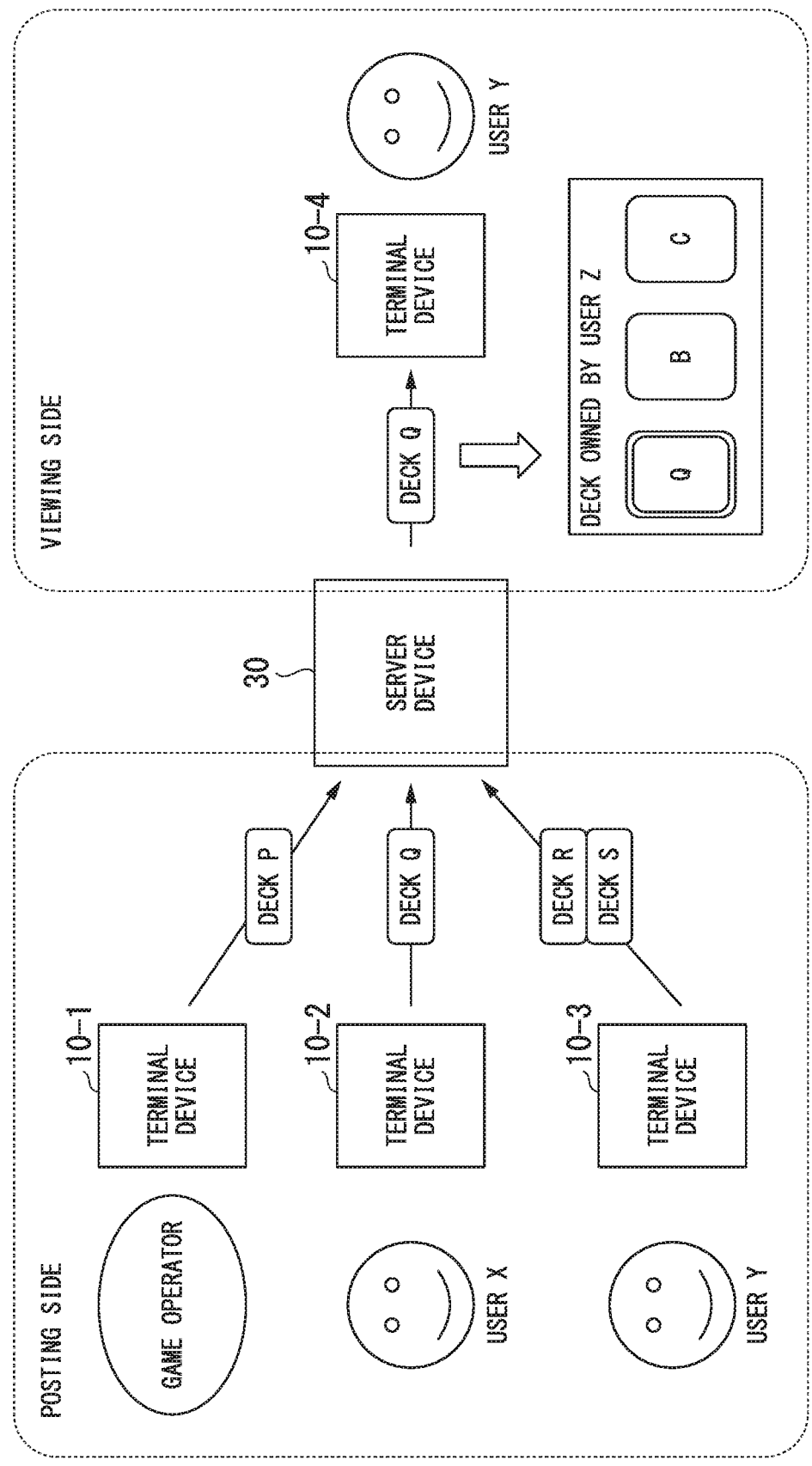
FIG. 1 is a diagram illustrating an outline of a game system according to a first embodiment of the present invention.

FIG. 1 is a diagram illustrating an outline of the game system 1 according to the embodiment.

In the example illustrated in FIG. 1, the game system 1 includes terminal devices 10-1 to 10-4 and a server device 30.

The terminal devices 10-1 to 10-4 are game consoles to which the respective users input operations when the users play the game. Here, the playing is a series of processes of causing a game to proceed by generating game results or updating game conditions in accordance with operation (also referred to as game operations) inputs for causing the game to proceed. Also, the playing is causing the game to proceed by each user (player) inputting game operations. Specifically, the playing is processing for competitions or the like, which will be described later. The user of the terminal device 10-1 is a game operator. The users of the terminal devices 10-2 to 10-4 are game players "X" to "Z". All the terminal devices 10-1 to 10-4 have equivalent functions, and in the example illustrated in FIG. 1, the terminal devices 10-1 to 10-3 function as devices for posting deck information while the terminal device 10-4 functions as a device for viewing the deck information. The deck information is a group of information pieces indicating decks that are information pieces of card IDs (Identifiers) of cards that construct a deck. The card IDs are card identification information.

The server device 30 is a so-called game server and performs control for causing the game to proceed in accordance with user's operations.

In addition, the server device 30 is also a deck management server device that manages deck information. The server device 30 accumulates deck information posted from the terminal devices 10-1 to 10-3 on a posting side. That is, the game operator and the users "X" and "Y" who are posters can post the deck information via the terminal devices 10-1 to 10-3 with which the game operator and the users "X" and "Y" themselves play the game. The server device 30 outputs deck information that the server device 30 itself manages in response to a request from the terminal device 10-4 on a viewing side. The user "Z" can request the deck information via the terminal device 10-4 with which the user "Z" himself/herself plays the game.

Output forms of the deck information include to display deck attribute information, to display cards that construct a deck, to display supplementary information that posters have added, and the like as well as to register a deck as an own deck of the user "Z". For example, the server device 30 may register a deck "Q" that the user "X" has posted as an own deck of the user "Z" as in the example illustrated in FIG. 1. In addition, the server device 30 extracts and sorts the posted deck information on the basis of predetermined conditions such as categories of decks and the like and causes names of the decks to be displayed in a list form as in the example illustrated in FIG. 2, for example. In addition, the server device 30 causes content of the deck information (cards that construct the deck) selected by the user "Z" to be displayed from among the posted deck information pieces as in the example illustrated in FIG. 3. Note that the registration means newly storing information or updating and storing information in the embodiment. Note that deck information output from the server device 30 to the terminal device 10-4 on the viewing side may be displayed on the terminal device 10-4 on the viewing side as described above or may be displayed on yet another display device by the terminal device 10-4 on the viewing side outputting the deck information to the display device. In addition, an output destination to which the server device 30 outputs the deck information is not limited to the terminal device 10-4 of the user "Z" and may be any terminal device in accordance with the configuration of the system.

Hereinafter, a deck for which a poster posts information will also be referred to as a posted deck. That is, the posted deck is a deck through which sharing of the information by the posting is intended. Meanwhile, a deck that each user can select when the user plays the game will also be referred to as owned deck. That is, the owned deck is a deck that each user actually uses when the user plays the game. In addition, deck information about a posted deck will also be referred to as posted deck information, and deck information about an owned deck will also be referred to as owned deck information. That is, types of deck information include posted deck information and owned deck information. In addition, posting means enabling reference to information from an arbitrary device that is connected to the server device 30 in the embodiment.

As described above, the server device 30 acquires posted deck information from the terminal devices 10-1 to 10-3 on the posting side. In addition, the server device 30 receives an output request related to the posted deck information from the terminal device 10-4 on the viewing side. Then, the server device 30 causes posted deck information corresponding to the output request and/or information related to the posted deck information (for example, posted deck attribute information, supplementary information) to be output. For outputting the posted deck information and/or the information related to the posted deck information, the server device 30 causes names of posted decks to be displayed in a list, for example, on the basis of predetermined conditions related to categories and the like of the decks. In addition, the server device 30 causes cards that construct a posted deck that has been selected by the user "Z" on the viewing side to be displayed from among the posted decks to be displayed, for example. Further, the server device 30 may enable posted deck information that a user who is different from the user "Z" has posted to be editable as owned deck information of the user "Z".

In this manner, the server device 30 provides various kinds of information about posted decks that other persons have posted to users who play the game. Therefore, the users can check the posted decks that other persons have posted and can use, for games, the posted decks that other persons have proposed. That is, the server device 30 facilitates utilization of the decks that other persons propose.

In addition, in a case of a game that proceeds by using cards extracted from decks, in particular, players may play the game by using a part of the cards that constructs the decks. Therefore, if players modify content of the decks, for example, it is difficult to determine whether or not the respective cards of the deck are necessary if the players have not played games by using the deck many times. For example, there may be a case in which a certain card "A" that constructs a deck has not been extracted when games were played several times. In this case, a player cannot determine whether or not the card "A" is necessary. In this manner, it is necessary to play games many times until the card is extracted in order to determine whether or not the specific card is necessary. In this regard, the game system 1 enables reference to content of set information that other users propose in such a game in which objects are extracted from the set information. That is, the players can refer to determination of other users about whether or not the card is necessary. Therefore, the game system 1 can promote examination of the content of the set information such as policies for modification.

Note that posted deck information, posted deck attribute information, and posted deck supplementary information will be collectively referred to as posted deck reference information in the following description.

The above is the description of the outline of the embodiment.

[Configuration of Game System 1]

Next, a configuration of the game system 1 will be described.

Figure 4:
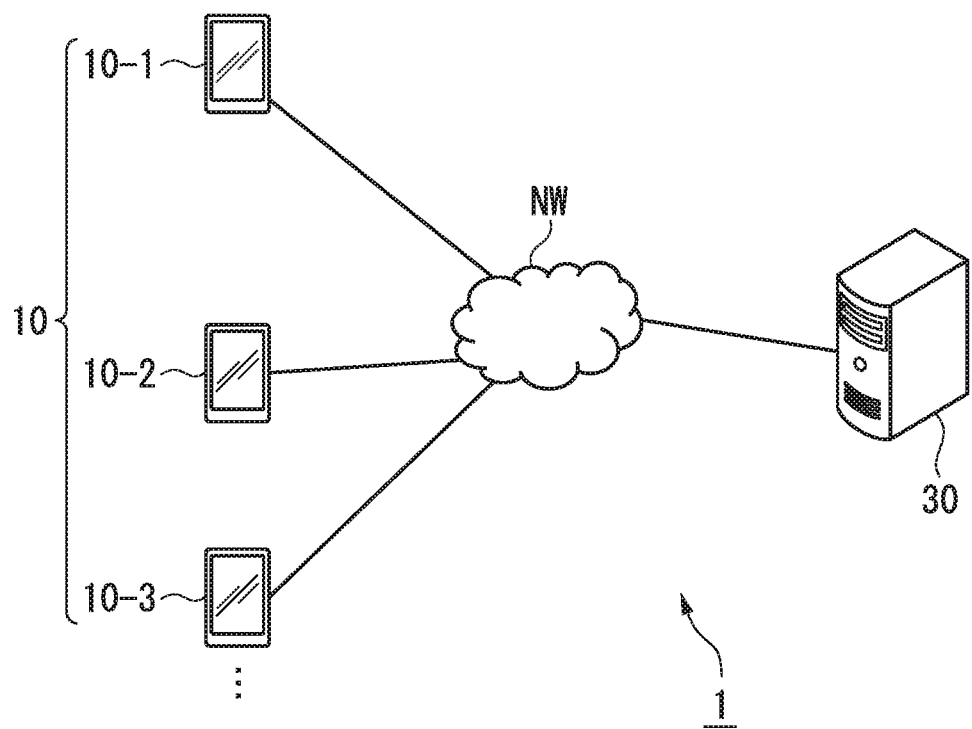
FIG. 4 is a diagram illustrating a configuration of a game system according to the embodiment.

FIG. 4 is a diagram illustrating the configuration of the game system 1.

As illustrated in FIG. 4, the game system 1 includes a plurality of terminal devices 10-1, 10-2, 10-3, . . . and a server device 30. The plurality of terminal devices 10-1, 10-2, 10-3, . . . and the server device 30 are respectively connected to a network NW and can communicate with each other. Since all the terminal devices 10-1, 10-2, 10-3, . . . have similar configurations, the terminal devices 10-1, 10-2, 10-3, . . . will be collectively referred to as terminal devices 10 by omitting statement of "31 1", "-2", and the like. Although three terminal devices 10 are illustrated, the number of terminal devices 10 may be an arbitrary number.

The server device 30 is an electronic device that includes a computer system.

The server device 30 provides a game that can be executed by the terminal devices 10. For example, the server device 30 provides a program for controlling the game (game control program) that the terminal devices 10 can execute in such a manner in which the game control program can be downloaded by the terminal devices 10. Also, the server device 30 stores various kinds of setting information, history information, and the like that are necessary for the game that is executed on the terminal devices 10, and as needed, transmits the information to the terminal devices 10. Note that the game control program that the terminal devices 10 download may be stored not only in the server device 30 but also in another server device from which the game control program can be downloaded.

In addition, the server device 30 manages various kinds of information such as card attribute information, deck information, posted information, player information, and owned card information. The card attribute information is information that indicates attributes of cards. The posted information is information that indicates posted content. The player information is information that indicates attributes of players. The terminal devices 10 can allow the players to refer to and update the information by accessing the server device 30.

The terminal devices 10 are electronic devices that include computer systems. Specifically, the terminal devices 10 are PCs (Personal Computers), tablet PCs, mobile phones such as smartphones or feature phones, mobile information terminals (PDAs: Personal Digital Assistants), or the like. The embodiment will be described on the assumption that the terminal devices 10 are smartphones as an example.

The terminal devices 10 download the game control program from the server device 30. Then, the terminal devices 10 function as game consoles by executing the downloaded game control program. The terminal devices 10 can edit decks, post decks, refer to various kinds of information that the server device 30 manages, and the like by the game control program.

Note that the following description will be given on the assumption that users are the users of the terminal devices 10. The users are players that play the game by using the terminal devices 10.

The above is the description of the configuration of the game system 1.

[Information that Game System 1 Processes]

Next, card attribute information, deck information, posted information, and player information that the game system 1 processes will be described.

First, the card attribute information will be described.

FIG. 5 is a diagram illustrating an example of the card attribute information.

In the example illustrated in FIG. 5, the card attribute information is configured such that card IDs, card name information, card type information, level information, offensive ability information, defensive ability information, card text information, effect information, version information, and image information are associated with each other.

The card name information is information that indicates names of cards. The card identification information is information that indicates types of cards. The types of cards include, for example, monster cards, magic cards, trap cards, and the like. Note that the magic cards and the trap cards will be referred to as "magic/trap cards" in the following description in a case in which the magic cards and the trap cards are not particularly distinguished from each other. The level information, the offensive ability information, the defensive ability information, the card text information, and the effect information are information that indicates parameters of the cards in the game. The version information is information that indicates divisions (versions) of cards based on when the cards first appeared or the like. The image information is information that indicates images of the cards.

Therefore, the terminal devices 10 and the server device 30 can specify names, types, parameters, versions, images, and the like of the respective cards with reference to the card attribute information.

The above is the description of the card attribute information.

Next, the deck information will be described.

FIG. 6 is a diagram illustrating an example of deck information.

In the example illustrated in FIG. 6, the deck information is configured by mutually linking frame IDs and card IDs. In addition, the deck information is stated for respective decks although this is not illustrated in the drawing. Specifically, the deck information is associated with the deck IDs and is stored. The deck IDs are information with which the decks are identified.

The frame ID is information with which frames in the decks are identified. The frames indicate orders and arrangements of cards that construct the decks. In the example illustrated in FIG. 3, for example, frames "1" to "32" are illustrated, and cards are respectively associated with the respective frames. In the example illustrated in FIG. 6, the frame IDs are shown in a format in which it is possible to specify purposes of the frames such as "main" that is mainly used at the time of playing the game, "side" that is used as a reserve card, and the like. If the frames and the cards are associated with each other in this manner, the terminal devices 10 and the server device 30 can faithfully reproduce the decks with reference to the deck information even in a case in which there are game properties according to orders, arrangements, and the like of the cards in the decks.

Note that there are two kinds of deck, namely owned decks and posted decks in accordance with purposes of utilization in the embodiment as described above. Types of user IDs corresponding to the owned deck information and the posted deck information differ from each other. The server device 30 mutually links the deck IDs and user IDs of game players and manages the deck IDs and the user IDs for the owned deck information.

In addition, the server device 30 mutually links the deck IDs and user IDs of persons who posted information on the decks and manages the deck IDs and the user IDs for the posted deck information. The terminal devices 10 instead of the server device 30 may manage either the owned deck information or the posted deck information or both the owned deck information and the posted deck information.

Note that the owned deck information and the posted deck information may have mutually different configurations or may have the same configurations. In addition, supplementary information such as notes of deck editors and competition results of the decks in addition to the attribute information such as the names of the decks and creation dates and times of the decks may be additionally associated with the deck IDs.

The above is the description of the deck information.

Next, posted information will be described.

FIG. 7 is a diagram illustrating an example of the posted information.

In the example illustrated in FIG. 7, the posted information is configured by mutually linking post IDs, poster IDs, posting date and time information, deck name information, category information, evaluation pt information, and blocked number information.

The post IDs are information with which posted decks are identified. Deck IDs of the posted decks are shown in the post IDs, for example. The poster IDs are information with which users who are posters are identified. The posting date and time information is information that indicates dates and times when the posting is performed. The deck name information is information that indicates names of the posted decks. The category information is information that indicates categories of the posted decks. Purposes of the decks at the time of playing the game and categories that indicate concepts of creating the decks, for example, are shown in the category information. The deck name information and the category information are examples of the attribute information of the posted decks. The evaluation information is information that indicates evaluation of posts, that is, evaluation of posted decks with scores (points). Hereinafter, scores indicated by the evaluation pt information will also be referred to as evaluation scores. The blocked number information is information that indicates the number of times display or utilization of decks has been blocked by users other than the posters. Blocking is a kind of filtering and is a function of excluding information that the users consider as being unnecessary. For example, a certain user may block a posted deck when the user refers to the posted deck and has an unpleasant feeling. Thereafter, the blocked posted deck is not displayed on the terminal device 10 of the user. That is, the blocked number information is information that represents negative evaluation of the posted decks. Designation of targets to be blocked may be performed in units of posted decks or in units of posters. In this manner, the evaluation pt information and the blocked number information are examples of evaluation information that indicates evaluation of the posted decks.

The terminal devices 10 and the server device 30 can specify when, and which of the users have posted which deck in which category and can specify evaluation of the posted decks with reference to the posted information.

The above is the description of the posted information.

Next, player information will be described.

FIG. 8 is a diagram illustrating an example of the player information.

In the example illustrated in FIG. 8, the player information is configured by mutually linking user IDs, player level information, game currency A information, game currency B information, information of the billing amount of this month, and age authentication information.

The player level information is information that indicates levels (achievements, ranks) of the users in the game. The game currency A information is information that indicates amounts of game currency A that users own. The game currency A is game currency which is acquired mainly by progression in the game. The game currency B information is information that indicates the amounts of game currency B. The game currency B is game currency that is purchased mainly with real money. Game currency that the users have purchased and game currency that have been acquired by progression in the game may be shown in a distinguished manner in the game currency B information. Information of the billing amount of this month is information that indicates the amount of money which the users have been charged for the game in the corresponding month. The age authentication information is information that indicates authentication results of users' ages. Upper limits of the billing amounts per month of the users may be defined on the basis of the authentication results.

Therefore, the terminal devices 10 and the server device 30 can identify degrees to which the respective users have played the game, with reference to the player information.

The above is the description of the player information.

[Configuration of Terminal Device 10]

Next, a configuration of each terminal device 10 will be described.

Figure 9:
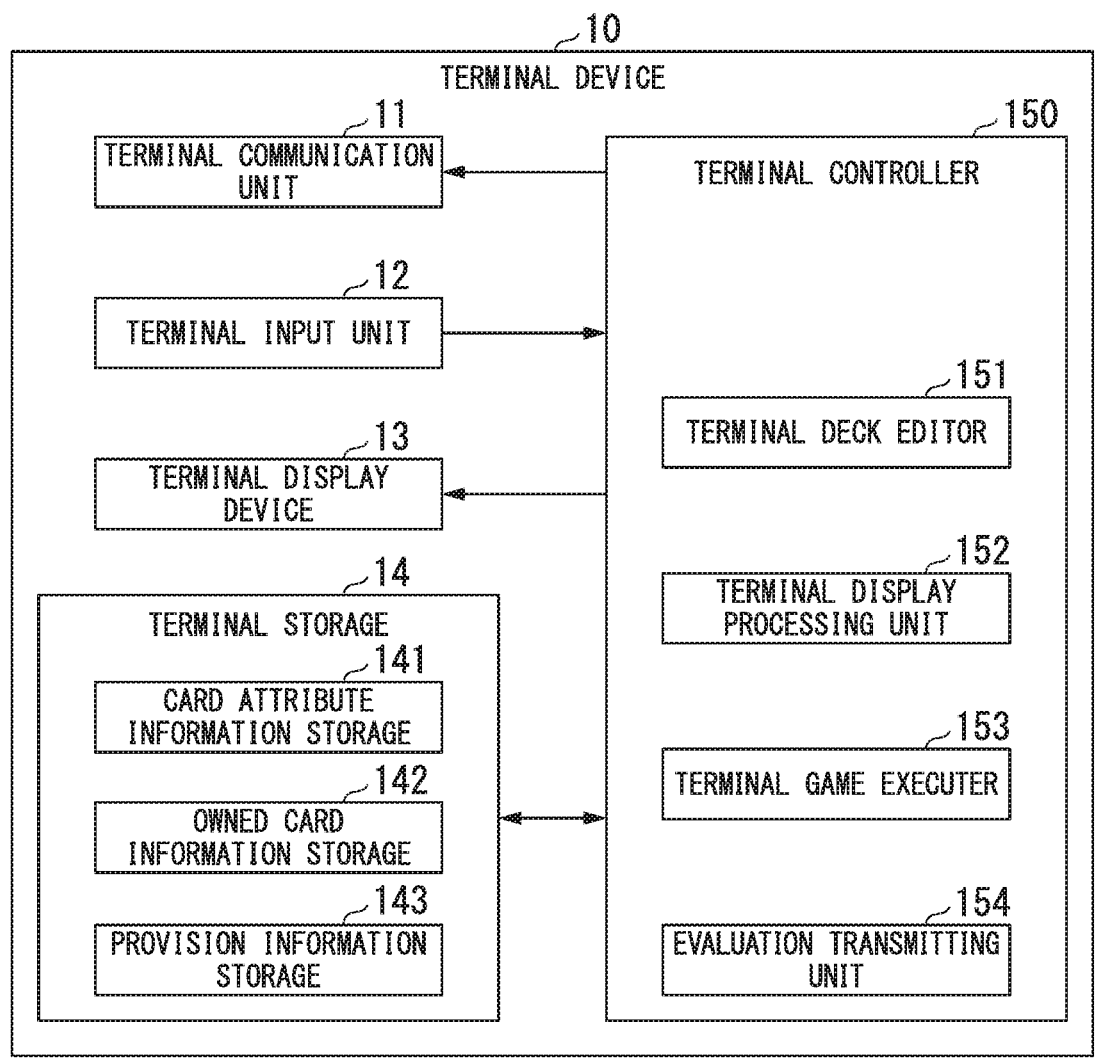
FIG. 9 is a block diagram illustrating a configuration of a terminal device according to the embodiment.

FIG. 9 is a block diagram illustrating the configuration of the terminal device 10.

As illustrated in FIG. 9, the terminal device 10 includes a terminal communication unit 11, a terminal input unit 12, a terminal display device 13, a terminal storage 14, and a terminal controller 150.

The terminal communication unit 11 communicates with the server device 30 via the network NW.

The terminal input unit 12 receives operation inputs from the users.

The terminal display device 13 displays images of various kinds and the like generated by the terminal controller 150.

The terminal storage 14 stores various kinds information that the terminal controller 150 refers to, processing results of the terminal controller 150, and the like. For example, the terminal controller 150 stores the user IDs with which the users are individually identified. In addition, the terminal storage 14 includes a card attribute information storage 141, an owned card information storage 142, and a provision information storage 143.

The card attribute information storage 141 stores card attribute information for the respective cards.

The owned card information storage 142 stores owned card information related to the user of the device, which includes the owned card information storage 142, itself. The owned card information is information that indicates cards that the user owns (hereinafter, referred to as owned cards). The owned card information is configured by linking the user ID and card IDs, with which the cards are identified, for example. Note that the user can own a plurality of cards with the same card IDs (same cards). These same cards may be managed with serial IDs such that the cards are individually distinguishable.

The provision information storage 143 stores provision information. The provision information is information that indicates regulations. For example, the regulations define the number of cards of the same type that can be included in one deck, the total number of cards that can be included in one deck, the number of specific cards that can be included in one deck, versions of cards that can be included in one deck, and the like. For a specific example of regulations, it may be conceived that the number of cards of the same type that can be included in one deck is three at a maximum, the number of cards that can be included in one deck is from 40 to 60, only one card of a specific type can be included in one deck, only cards of specific versions can be included, and the like.

Note that content of the regulations is changed in some cases as described above. For example, it may be assumed that one regulation defines a restriction that only one card "A" that is too powerful can be included in a deck. Meanwhile, there is a case in which relaxing or release of this restriction is triggered by a new appearance of a card "B" that is for countering the card "A". In addition, there may be a case in which a restriction that only one newly appearing card "C" can be included in the deck is newly defined as a regulation because the card "C" is a powerful card, for example.

The terminal controller 150 controls various components that the terminal device 10 includes. The terminal controller 150 is realized by a CPU (Central Processing Unit) in the terminal device 10 executing the game control program stored in advance in the terminal storage 14, for example. Note that a part or all of the terminal controller 150 may be realized as an integrated circuit in hardware, such as an LSI (Large Scale Integration) or an ASIC (Application Specific Integrated Circuit).

The terminal controller 150 includes a terminal deck editor 151, a terminal display processing unit 152, a terminal game executer 153, and an evaluation transmitting unit 154.

The terminal deck editor 151 controls editing of deck information on the basis of editing operations by users' editing operations. Here, the editing of the deck information includes both newly creating deck information and updating existing deck information. That is, the editing of deck information includes copying content of a posted deck directly to an owned deck, that is, linking posted deck information to a player. In addition, displaying deck information in an editable manner means enabling reception of users' editing operations while displaying deck information. The terminal deck editor 151 may edit posted deck information or may edit owned deck information. In the following description, requesting the server device 30 to perform processing from the terminal devices 10 in editing of deck information will also be referred to as an editing request.

In the editing of deck information, the terminal deck editor 151 receives selection of deck information to be edited from a user. Then, the terminal deck editor 151 acquires the deck information to be edited from the server device 30. Then, the terminal deck editor 151 updates the deck information in accordance with a user's editing operation. Then, the terminal deck editor 151 determines whether or not the deck information after the updating conforms to the regulations with reference to the provision information stored in the provision information storage 143. The terminal deck editor 151 links a determination result to the deck information and stores the determination result with the deck information. The terminal deck editor 151 transmits the deck information after the updating to the server device 30 and requests the server device 30 to register the deck information after the updating. That is, the terminal deck editor 151 requests the server device 30 to store the deck information after the updating as a user's owned deck or a posted deck. In this manner, the deck information after the updating is stored in the server device 30. In this manner, a deck is newly created or updated in a case of owned deck information while a deck is posted in a case of posted deck information.

In addition, the terminal deck editor 151 receives inputs of attribute information and supplementary information of a posted deck from a user. The terminal deck editor 151 links a user ID, a posting date and time, and the like to the input attribute information and supplementary information, thereby creating posted information. The terminal deck editor 151 transmits the generated posted information to the server device 30 and requests the server device 30 to register the posted information. In this manner, the attribute information and the supplementary information of the posted deck are stored in the server device 30. That is, the terminal deck editor 151 posts the attribute information and the supplementary information of the posted deck.

Note that although the case in which the terminal deck editor 151 edits deck information and transmits the deck information after the editing to the server device 30 has been described here, the present invention is not limited thereto. For example, the terminal deck editor 151 may transmit an editing operation from a user to the server device 30 as needed and may request the server device 30 to edit the deck information. Then, the server device 30 edits the deck information on the basis of the user's editing operation or the like acquired from the terminal deck editor 151 and transmits a processing result corresponding to the operation to the terminal device 10 as needed. In this manner, substantial processing for editing the deck information may be performed by the terminal device 10 or may be performed by the server device 30. Also, substantial processing of generating posted information may be performed by the terminal device 10 or may be performed by the server device 30 similarly to the editing of the deck information.

The terminal display processing unit 152 controls various kinds of screen display such as a screen for viewing a posted deck, a screen for editing a deck, and a game screen in accordance with user's operations. Here, only display control for a posted deck will be described, and description of display control for other screens will be omitted. In the following description, requesting the server device 30 to perform processing by the terminal device 10 in the display control for a screen will also be referred to as a display processing request.

Figure 2:
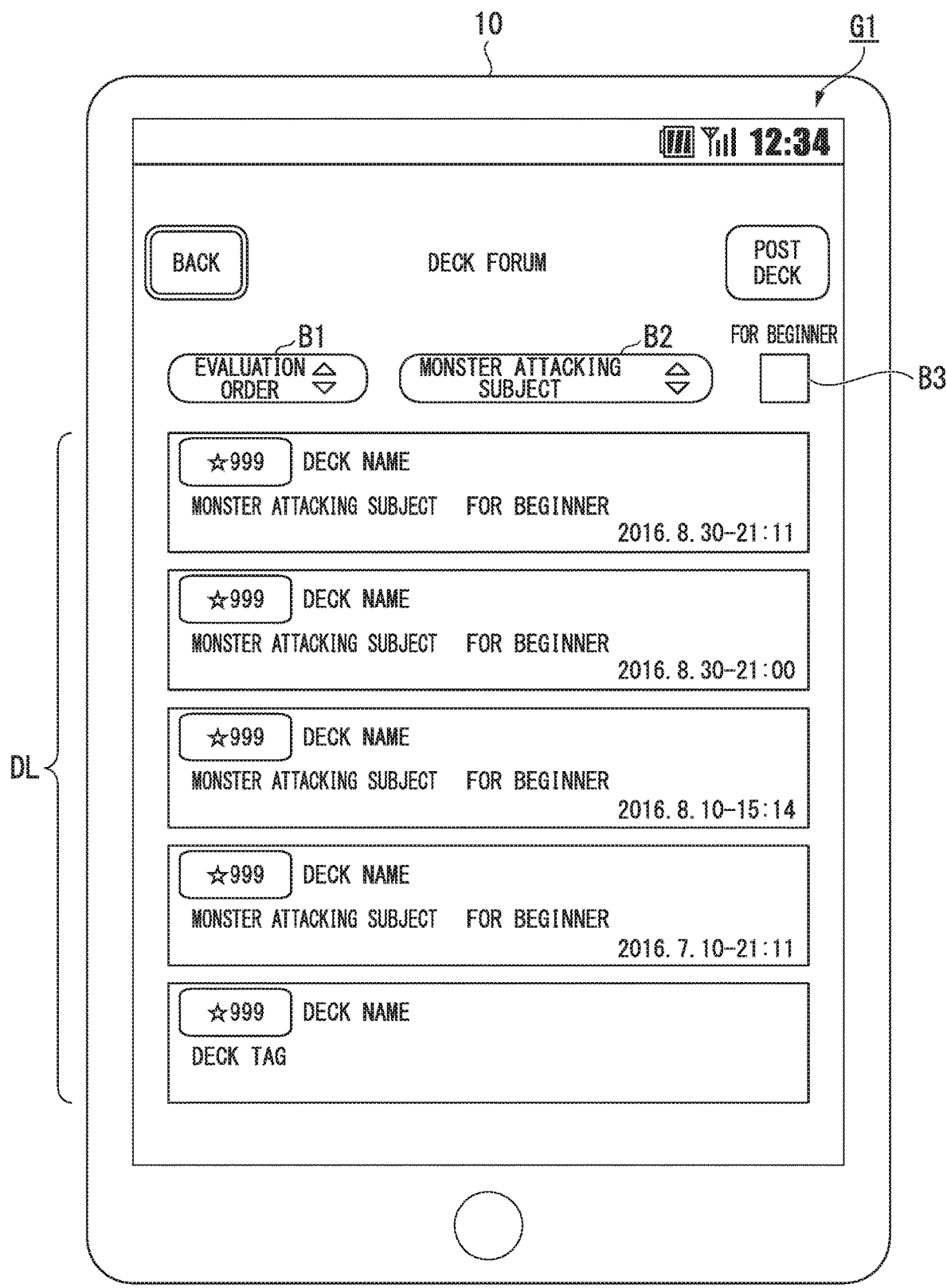
FIG. 2 is a diagram illustrating an example of a posted deck list screen according to the embodiment.
Figure 3:
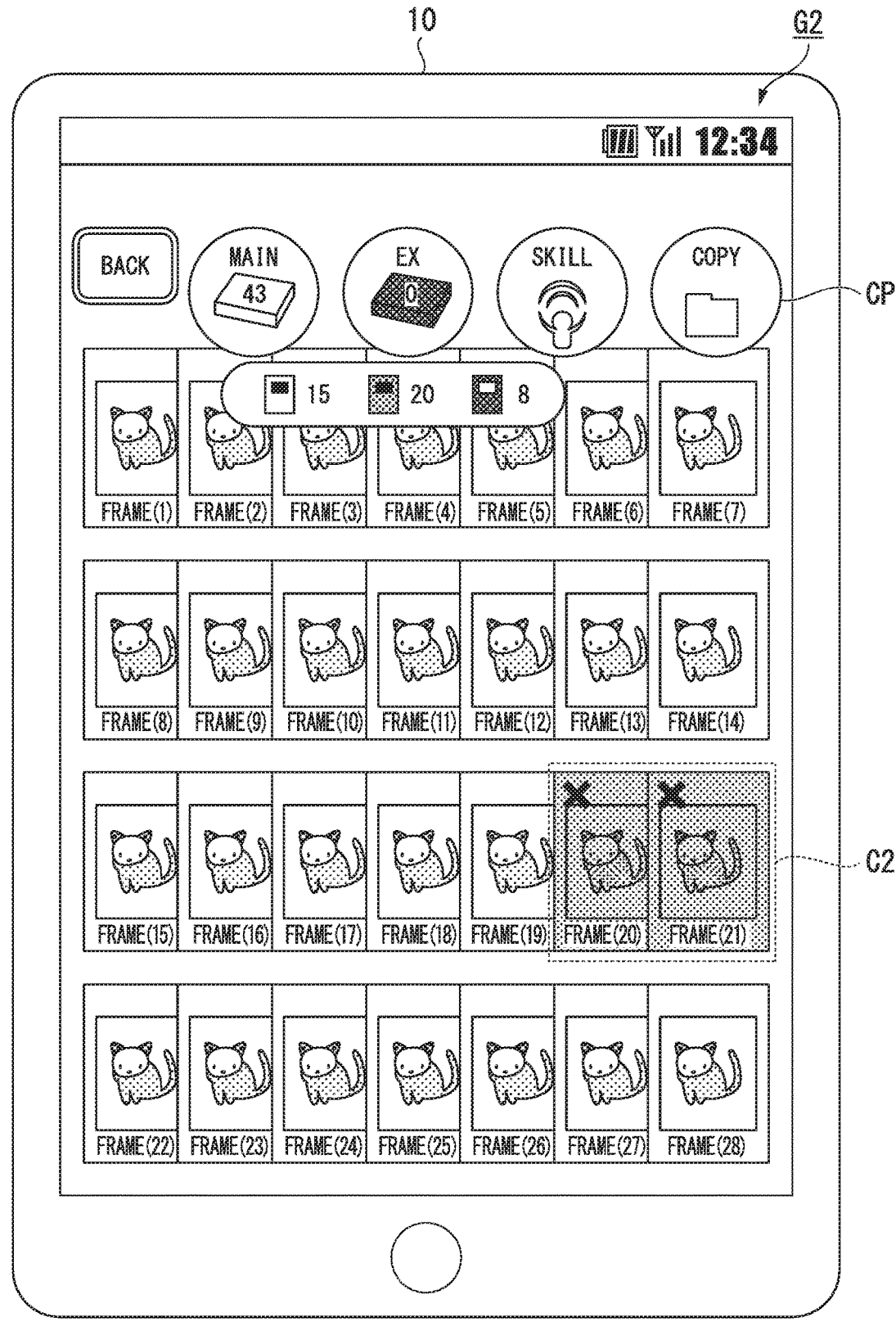
FIG. 3 is a diagram illustrating an example of a posted deck detail screen according to the embodiment.

First, the terminal display processing unit 152 requests the server device 30 to transmit posted deck reference information. The terminal display processing unit 152 acquires the posted deck reference information transmitted from the server device 30 in response to the display processing request. The terminal display processing unit 152 causes the terminal display device 13 to display the acquired posted deck reference information. In this manner, the terminal display processing unit 152 can display a list of attribute information of posted decks as illustrated in FIG. 2 and display content of posted decks as illustrated in FIG. 3.

Here, the terminal display processing unit 152 can designate various extraction conditions and request the server device 30 to extract the posted deck reference information. As the extraction conditions, items and values included in the posted deck reference information are designated as retrieval keys for extracting the posted deck reference information. The extraction conditions may be defined in advance or may be designated or changed by the user. The terminal display processing unit 152 can acquire the posted deck reference information that conforms to the items and the values designated as the extraction conditions from among the posted deck reference information pieces stored in advance in the server device 30 by notifying the server device 30 of the extraction conditions. As the extraction conditions, it is possible to employ categories of posted decks, presence of specific cards in posted decks, numbers of rare cards in posted decks, evaluation of posted decks, posters, posting dates and times, creation dates and times of posted decks, conformity to the regulations, comparison with owned cards, comparison with owned decks and the like.

The terminal device 10 can acquire a posted deck in a category that the user desires, by setting the category of the posted deck as an extraction condition.

The terminal device 10 can acquire a posted deck using specific cards that the user desires, by setting presence of the specific cards in the posted deck as an extraction condition.

The terminal device 10 can acquire a posted deck in accordance with difficulties in construction by setting the number of rare cards in the posted deck as an extraction condition.

The terminal device 10 can acquire a posted deck with high evaluation or exclude a deck with low evaluation by setting evaluation of the posted deck as an extraction condition.

The terminal device 10 can block posting of specific users or acquire only posting from friends by setting posters as an extraction condition.

The terminal device 10 can acquire a newly proposed posted deck or acquire a posted deck that has been utilized over a long period of time, by setting posting time and date or creation date and time of a posted deck as an extraction condition.

It is possible to acquire a posted deck that conforms to new regulations even in a case in which the regulations have been changed, by setting conformity to the regulations as an extraction condition.

The terminal device 10 can acquire a posted deck that is constructed only by cards that the user owns or a posted deck that is constructed to include many cards that the user owns (that is, a posted deck that is constructed to include a relatively small number of cards that the user does not own), by setting comparison with owned cards as an extraction condition.

The terminal device 10 can acquire a posted deck that is similar to the owned deck, by setting comparison with the owned deck as an extraction condition. In this case, the server device 30 performs comparison of card IDs, comparison of types, comparison of parameters, comparison of versions, and the like between the cards that construct the owned deck and the cards that construct the posted deck, for example. Then, a posted deck that conforms at high proportions in regard to the card IDs, the types, the parameters, the versions, and the like in the comparison is extracted.

In addition, the terminal device 10 may set the number of rare cards that the user owns, a level of the user in the game, the number of rare cards in the deck, and the like as conditions in a case in which "recommendation" setting for automatically setting condition is selected.

In addition, the terminal display processing unit 152 may control sorting of posted deck reference information on the basis of sort conditions that are similar to the aforementioned extraction conditions in display of the posted deck reference information. As the sorting conditions, items, how large values are, and the like of the posted deck information are designated as conditions for deciding an order in which the posted deck reference information pieces are displayed. The sorting conditions may be defined in advance or may be designated and changed by the user. The terminal display processing unit 152 sorts the posted deck reference information pieces extracted by the server device 30 in a descending order of conformity to the items and the values designated as the sorting conditions. The sorting of the posted deck reference information based on the sorting conditions may be performed by the terminal display processing unit 152 or may be performed by the server device 30.

In addition, the terminal display processing unit 152 can request the server device 30 to transmit specific deck reference information. In this case, the terminal display processing unit 152 transmits a post ID or a deck ID to the server device 30.

In addition, the terminal display processing unit 152 controls display forms of the cards that construct the posted decks on the basis of deck content display conditions for the display of the cards in a case in which the content of the posted decks is displayed on the basis of the posted deck information. The deck content display conditions are conditions for designating the display forms of the cards that construct the decks. The display forms of the cards include a display order of the cards, how the cards attract attention (adjustment of brightness, addition of icon images, and the like), display/non-display of the cards, and the like. The terminal display processing unit 152 displays the cards that construct the posted decks such that the cards conform to the deck content display conditions. The deck content display conditions may be defined in advance or may be designated and changed by the user.

As the deck content display conditions, conditions that are similar to the aforementioned extraction conditions and the sorting conditions may be employed, or different conditions may be employed. As the deck content display conditions, comparison with the owned cards and conformity to the regulations, for example, can be employed. The terminal display processing unit 152 can indicate that which of the cards that constitute the posted decks the user owns, for example, by setting the comparison with the owned cards as a condition. The terminal display processing unit 152 can indicate which of the cards that constitute the posted decks does not conform to the regulations, for example, by setting the conformity to the regulations as a condition.

Note that although the case in which the terminal display processing unit 152 displays images on the basis of the posted deck reference information has been described here, the present invention is not limited thereto. For example, the terminal deck editor 151 may notify the server device 30 of user's operations as needed to request the server device 30 to extract posted deck reference information and generate images based on the posted deck reference information. Then, the server device 30 performs the extraction of the posted deck reference information and the generation of the images based on the posted deck reference information and transmits the generated images to the terminal device 10 as needed, on the basis of the user's operations and the like in the notifications from the terminal display processing unit 152. In this manner, substantial processing for display various screens may be performed by the terminal device 10 or may be performed by the server device 30.

The terminal game executer 153 performs control for executing the game. The terminal game executer 153 may perform substantial processing for causing the game to proceed in the device, which includes the terminal game executer 153, itself or may perform auxiliary processing for causing the game to proceed in the server device 30. For example, the terminal game executer 153 may complete processing for causing the game to proceed only in the device, which includes the terminal game executer 153, itself. In the embodiment, a case in which the substantial game processing is performed in the server device 30 will be described as an example. In this case, the terminal game executer 153 notifies the server device 30 of user's game operations as needed. Then, the terminal game executer 153 acquires game results corresponding to the game operations from the server device 30 and presents the game results to the user as needed.

In addition, the terminal game executer 153 determines whether or not deck information selected by the users for playing the game conforms to the regulations. Here, the terminal deck editor 151 or the server deck editor 352 determines whether or not decks conform to the regulations as described above, and results of the determination are associated with the deck information and are stored with the deck information.

The terminal game executer 153 refers to the results of the determination, and in a case in which the fact that deck information selected by the user does not conform to the regulations is stored for playing the game, the terminal game executer 153 performs processing of restricting use of the deck information in the game. For example, the terminal game executer 153 inhibits utilization of the selected deck information and allows the user to reselect deck information.

In addition, the terminal game executer 153 acquires various kinds of information necessary for executing the game from the server device 30. For example, card attribute information has been updated, the terminal game executer 153 acquires the card attribute information from the server device 30 and causes the card attribute information storage 141 to store the card attribute information. In addition, when the user logs in the game and starts the game, or when owned cards have been changed after purchase of cards, for example, the terminal game executer 153 acquires owned card information from the server device 30 and causes the owned card information storage 142 to store the owned card information.

The evaluation transmitting unit 154 notifies the server device 30 of user's evaluation about the posted decks. The evaluation transmitting unit 154 determines whether or not a predetermined evaluation condition is satisfied. Evaluation information will be described later. In a case in which it is determined that the evaluation condition is satisfied, the evaluation transmitting unit 154 notifies the server device 30 of the fact that the evaluation condition is satisfied.

The above is the description of the configuration of the terminal device 10.

[Configuration of Server Device 30]

Next, a configuration of the server device 30 will be described.

Figure 10:
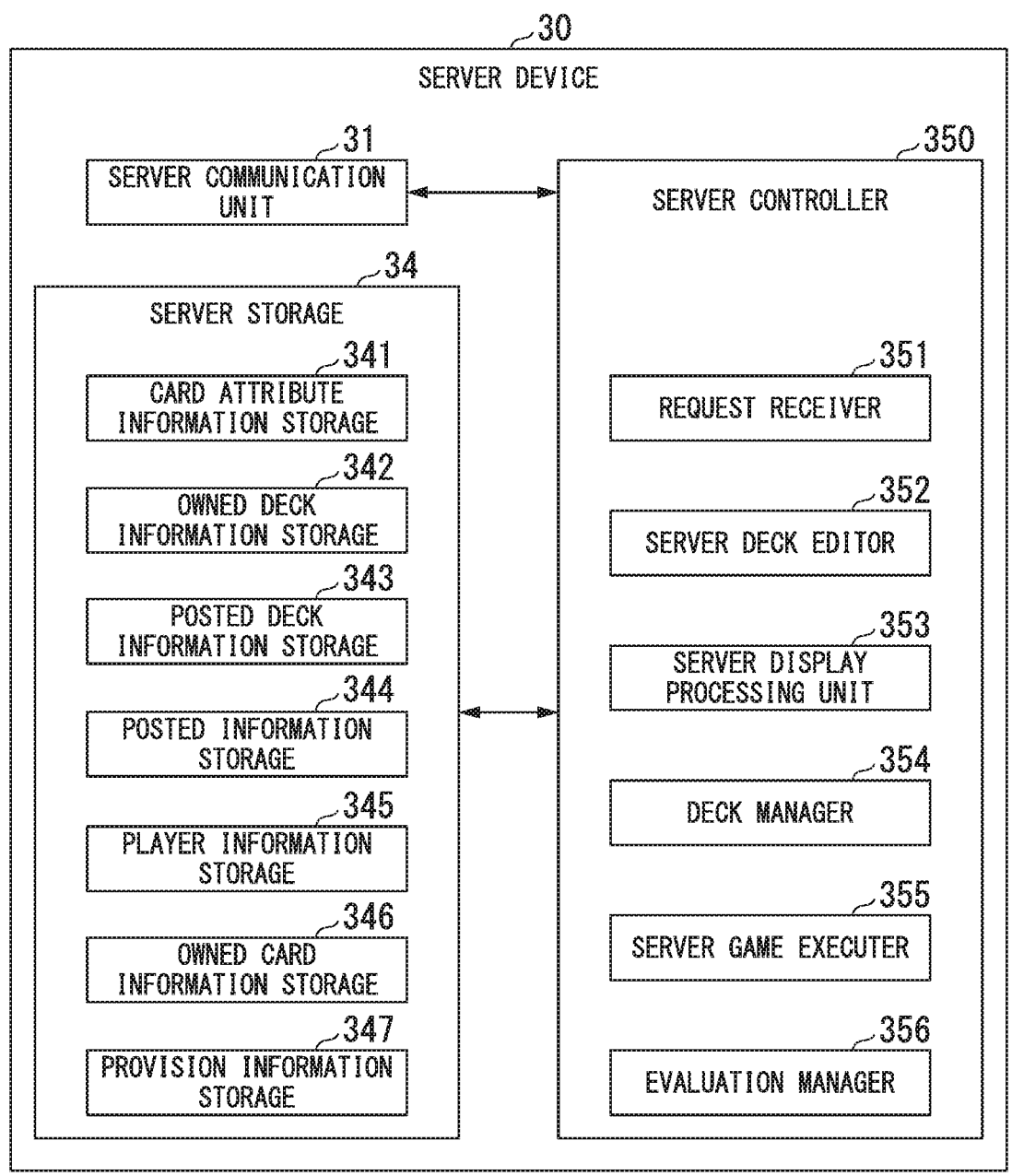
FIG. 10 is a block diagram illustrating a configuration of a server device according to the embodiment.

FIG. 10 is a block diagram illustrating the configuration of the server device 30.

As illustrated in FIG. 10, the server device 30 includes a server communication unit 31, a server storage 34, and a server controller 350.

The server communication unit 31 communicates with each terminal device 10 via the network NW.

The server storage 34 stores various kinds of information, processing results of the server controller 350, and the like that the server controller 350 refers to. In addition, the server storage 34 includes a card attribute information storage 341, an owned deck information storage 342, a posted deck information storage 343, a posted information storage 344, a player information storage 345, an owned card information storage 346, and a provision information storage 347.

The card attribute information storage 341 stores card attribute information for the respective cards.

The owned deck information storage 342 stores owned deck information for the respective users (players). Specifically, the owned deck information storage 342 links the owned deck information to an owned deck ID and a user ID of each player and stores the owned deck information with the owned deck ID and the user ID.

The posted deck information storage 343 stores deck information for the respective users (posters).

The posted information storage 344 stores posted information for the respective posted decks.

The player information storage 345 stores player information for the respective users (players).

The owned card information storage 346 stores owned card information for the respective users (players).

The provision information storage 347 stores provision information.

The server controller 350 controls various configurations that the server device 30 includes. The server controller 350 is realized by a CPU in the server device 30 executing a game control program for the server, a deck management program, and the like stored in advance in the server storage 34, for example. Note that a part or entirety of the server controller 350 may be realized as an integrated circuit of hardware, such as LSI or an ASIC.

The server controller 350 includes a request receiver 351, a server deck editor 352, a server display processing unit 353, a deck manager 354, a server game executer 355, and an evaluation manager 356.

The request receiver 351 receives requests from each terminal device 10. In a case in which a deck editing request is received from the terminal device 10, the request receiver 351 notifies the server deck editor 352 of content of the editing request. In a case in which a display processing request is received from the terminal device 10, the request receiver 351 notifies the server display processing unit 353 of content of the display processing request.

The server deck editor 352 has a configuration corresponding to the terminal deck editor 151 of the terminal device 10 and performs control on the side of the server device 30 in editing deck information. If an editing request is received from the request receiver 351, the server deck editor 352 executes processing designated by the editing request.

In the editing of the deck information, the server deck editor 352 reads deck information desiccated as a target to be edited by the terminal device 10 from the owned deck information storage 342 or the posted deck information storage 343. The server deck editor 352 transmits the read deck information to the terminal device 10. The server deck editor 352 acquires the deck information after the editing from the terminal device 10. In a case in which the acquired deck information indicates an owned deck, the server deck editor 352 causes the owned deck information storage 342 to store the deck information. In addition, in a case in which the acquired deck information indicates a posted deck, the server deck editor 352 causes the posted deck information storage 343 to store the deck information. The server deck editor 352 acquires posted information from the terminal device 10 and then causes the posted information storage 344 to store the acquired posted information. In other words, the server deck editor 352 outputs the posted deck reference information acquired from the terminal device 10 to the server storage 34.

The server display processing unit 353 has a configuration corresponding to the terminal display processing unit 152 of the terminal device 10 and performs control on the side of the server device 30 in the editing of the deck information. The terminal display processing unit 152 receives a display processing request from the request receiver 351 and then executes processing designated by the display processing request.

The server display processing unit 353 receives the display processing request from the request receiver 351 and then extracts posted deck reference information from the server storage 34 on the basis of the designated extraction conditions. The server display processing unit 353 transmits the extracted posted deck reference information to the terminal device 10. In other words, the server display processing unit 353 outputs the extracted posted deck reference information to the terminal device 10. In this manner, the posted deck reference information that the server display processing unit 353 transmits is displayed on the terminal device 10.

In a case in which a category of a posted deck is designated as an extraction condition, for example, the server display processing unit 353 extracts posted information from the posted information storage 344 by using the designated category as a retrieval key. The server display processing unit 353 extracts posted deck information associated by a post ID of the extracted posted information from the posted deck information storage 343. In this manner, the server display processing unit 353 extracts the posted deck reference information in accordance with the designated extraction condition.

The deck manager 354 adjusts the data amount of the posted deck reference information. The deck manager 354 refers to the posted information and deletes, from the posted deck information storage 343, posted deck information of posted decks after elapse of time from posting. In addition, the deck manager 354 refers to the posted information and deletes posted deck information of posted decks with low evaluation scores from the posted deck information storage 343. At this time, the deck manager 354 may delete the posted information from the posted information storage 344. The deck manager 354 may delete such posting that either elapsed time or evaluation or both the elapse time and the evaluation do not satisfy references. For example, the deck manager 354 may be adapted not to delete posting for one month even if evaluation thereof is low. In addition, the deck manager 354 may delete posted deck information posted one month or more ago and with evaluation scores that are equal to or less than a predetermined value or may delete posting with evaluation ranked not within the highest 3000 cases, for example. In This manner, it is possible to appropriately manage the number of posted deck information pieces.

The server game executer 355 has a configuration corresponding to the terminal game executer 153 of the terminal device 10 and performs control for executing the game on the side of the server device 30. For example, the server game executer 355 transmits various kinds of information that is necessary to execute the game to the terminal device 10. In addition, the server game executer 357 causes the game to proceed in accordance with game playing operations transmitted from the terminal device 10 and generates game results, for example. The server game executer 357 transmits the generated game results to the terminal device 10. In addition, the server game executer 355 updates player information stored in the player information storage 345 in accordance with the game results.

The evaluation manager 356 manages evaluation information of posted decks. The evaluation manager 356 updates the evaluation information on the basis of predetermined evaluation conditions. Arbitrary conditions can be employed as the evaluation conditions. For example, registering of a posted deck as an owned deck, playing the game by using the posted deck, winning the game by using the posted deck, registering the posted deck as a main deck, designating positive evaluation from the user, and the like may be set as evaluation conditions for adding evaluation scores. In addition, excluding the posted deck from the owned deck, losing the game by using the posted deck, excluding the posted deck from the main deck, changing content of the deck, designating negative evaluation by the user, blocking the posted deck, and the like may be set as evaluation conditions for subtracting evaluation scores. Specific examples of the evaluation conditions include receiving of an operation for designating "good" as positive evaluation, receiving an operation for designating "bad" as negative evaluation, receiving an operation for blocking display of the posted deck, and the like. Information that describes the evaluation conditions and information that describes the amount of updated evaluation in accordance with the evaluation conditions are stored in the server storage 34, for example. Note that in a specific example of the evaluation conditions a user's operation of inputting a result of marking the posted deck out of 100 points or the like may be received or an average value or the like of marked results may be managed as evaluation information of the posted deck.

The evaluation manager 356 updates the evaluation information of the posted deck in a case in which the evaluation conditions are satisfied. The determination about whether or not the evaluation conditions are satisfied may be performed by the evaluation manager 356 or may be performed by the evaluation transmitting unit 154 of the terminal device 10. The evaluation manager 356 reflects evaluation (for example, an evaluation score, a blocked number, and the like) in accordance with the satisfied evaluation conditions to the evaluation information. Specifically, the evaluation manager 356 reads posted information of a posted deck to be evaluated from the posted information storage 344. The evaluation manager 356 updates the evaluation information in the posted information.

If a posted deck is blocked, for example, evaluation information of the posted deck is updated. The evaluation information may be updated in units of posted decks or in units of posters. In a case in which a certain posted deck is blocked, for example, the evaluation manager 356 may update only evaluation information of the posted deck or may update evaluation information of all posted decks that the poster thereof has posted. In addition, the evaluation manager 356 may restrict or inhibit posting from a poster, the blocked number from which exceeds a predetermined number. In this manner, the evaluation manager 356 updates evaluation information of the posted decks on the basis of evaluation of the posted decks from users. In other words, the evaluation manager 356 can update the evaluation information of the posted decks on the basis of an evaluation information update request from the terminal device 10. That is, user's evaluation of the posted decks as described above is an example of an evaluation information update request from the terminal device 10.

The above is the description of the configuration of the server device 30.

[Configuration of Computer System]

Next, a computer system 90 that each of the terminal devices 10 and the server device 30 include will be described.

Figure 11:
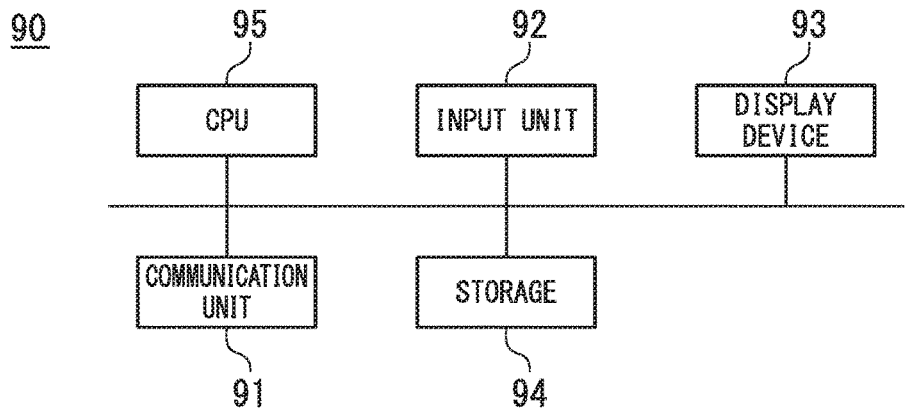
FIG. 11 is a block diagram illustrating a computer system according to the embodiment.

FIG. 11 is a block diagram illustrating a configuration of the computer system 90.

The computer system 90 includes, for example, a communication unit 91, an input unit 92, a display device 93, a storage 94, and a CPU 95. These components are connected to each other via a bus such that the components can communicate with each other.

The communication unit 91 communicates with the server device 30 and other devices via the network NW.

The input unit 92 is an input device such as a keyboard and a mouse, a touch pad, or a microphone to which various sound instructions are input, and various instructions are input thereto by user's operations. The input unit 92 may be integrally formed with a display (display device 93) as a touch panel.

The display device 93 is a display that displays information such as images and texts and is configured to include a liquid crystal display panel or an organic EL (ElectroLuminescense) display panel, for example.

The storage 94 includes, for example, an HDD (Hard Disk Drive), an SDD (Solid State Drive), an EEPROM (Electrically Erasable Programmable Read-Only Memory), a ROM (Read-Only Memory), a RAM (Random Access Memory), or the like and stores various kinds of information, images, programs (including the game control program), and the like that the terminal device 10 processes. Note that the storage 94 is not limited to a storage incorporated in the terminal device 10 and may be an external storage device connected by a digital input/output port such as a USB or the like. In addition, the terminal device 10 may be configured to include a hardware configuration such as a speaker, a sound output terminal, a camera, a gyro sensor, or a GPS (Global Positioning System) reception module, which are not illustrated in the drawing.

The CPU 95 executes various programs stored in the storage 94 and controls the respective parts in each terminal device 10 and the server device 30.

The above is the description of the computer system 90.

[Operations of Game System 1]

Next, operations of the game system 1 will be described.

Hereinafter, a case in which a game application based on a game control program has been activated in a terminal device 10 will be described. When the game application is activated, the terminal device 10 acquires the latest owned card information, owned deck information, player information, provision information and the like from the server device 30 and cause the terminal storage 14 to store the information.

First, operations of the game system 1 at the time of editing a deck will be described.

Figure 12:
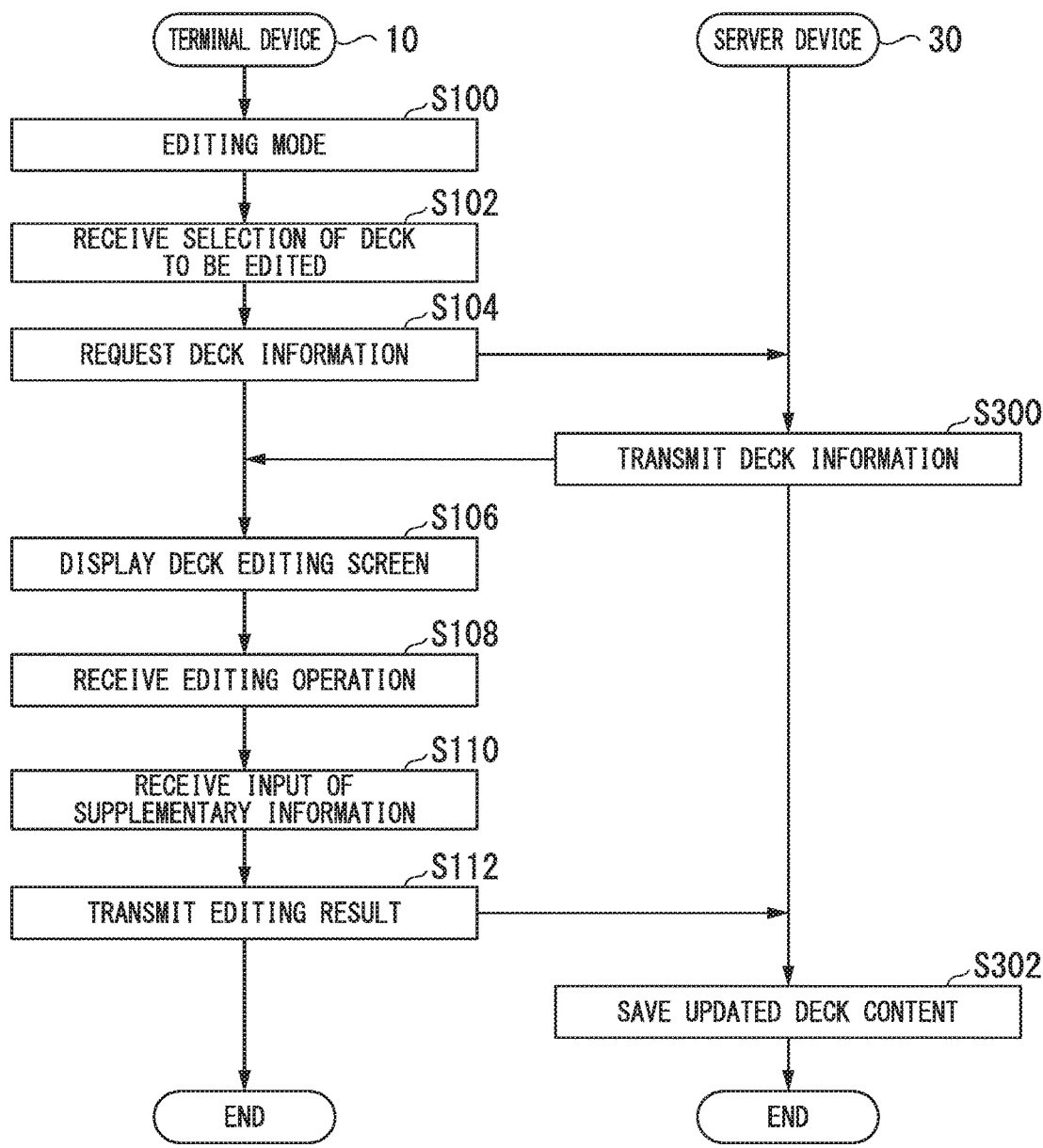
FIG. 12 is a sequence chart illustrating an example of a flow of deck editing processing according to the embodiment.

FIG. 12 is a sequence chart illustrating an example of a flow for deck editing processing.

(Step S100) The terminal device 10 activates an editing mode for editing a deck.

The editing mode is a mode for editing or posting deck information. The editing mode is activated by an activation operation performed on a menu screen of the game, for example. In addition, the editing mode may be activated from a viewing mode, which will be described later. Thereafter, the game system 1 advances processing to Step S102.

(Step S102) The terminal device 10 receives user's selection of a deck to be edited. Thereafter, the game system 1 advances processing to Step S104.

Here, a user interface at the time of selecting a deck to be edited will be described.

Figure 13:
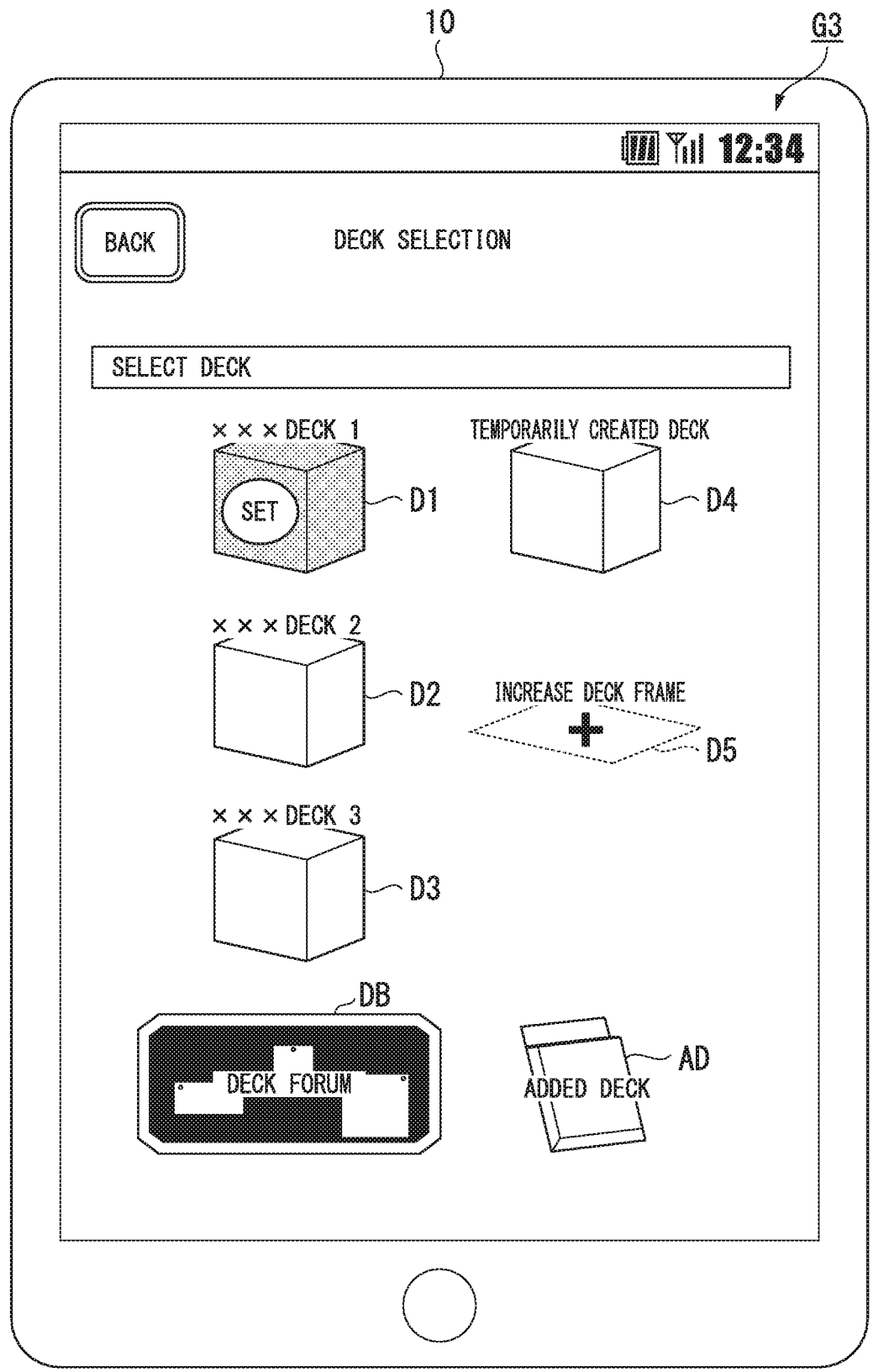
FIG. 13 is a diagram illustrating an example of a deck selection screen according to the embodiment.

FIG. 13 is a diagram illustrating an example of a deck selection screen.

The deck selection screen is a screen for receiving selection of a deck to be edited. In the example illustrated in FIG. 13, four deck selection buttons D1 to D4, a new deck creation button D5, and a posted deck viewing button DB are provided in a deck selection screen G3. An icon "SET" is overlaid on the deck selection button D1, and the fact that deck is used to play the game as a default is explicitly described thereon. If the deck selection buttons D1 to D4 are selected by the user, the terminal device 10 reads owned deck information corresponding to the respective buttons. In addition, if new deck creation button D5 is selected by the user, the terminal device 10 newly generates owned deck information. In addition, if the posted deck viewing button DB is selected by the user, the terminal device 10 activates a deck viewing mode, which will be described later.

The above is the description of the user interface at the time of selecting the deck to be editing.

(Step S104) The terminal device 10 requests the server device 30 to transmit deck information of the deck to be edited selected by the user. At this time, the terminal device 10 transmits a deck ID of the deck to be edited to the server device 30. Thereafter, the game system 1 advances the processing to Step S300.

(Step S300) The server device 30 acquires the deck ID from the terminal device 10. The server device 30 reads owned deck information or posted deck information by using the acquired deck ID as a retrieval key. The server device 30 transmits the read deck information to the terminal device 10.

Thereafter, the game system 1 advances the processing to Step S106.

(Step S106) The terminal device 10 acquires the deck information from the server device 30. The terminal device 10 displays the deck editing screen on the basis of the acquired deck information and owned card information read from the owned card information storage 142. Thereafter, the game system 1 advances the processing to Step S108.

Here, a user interface at the time of editing a deck will be described.

Figure 14:
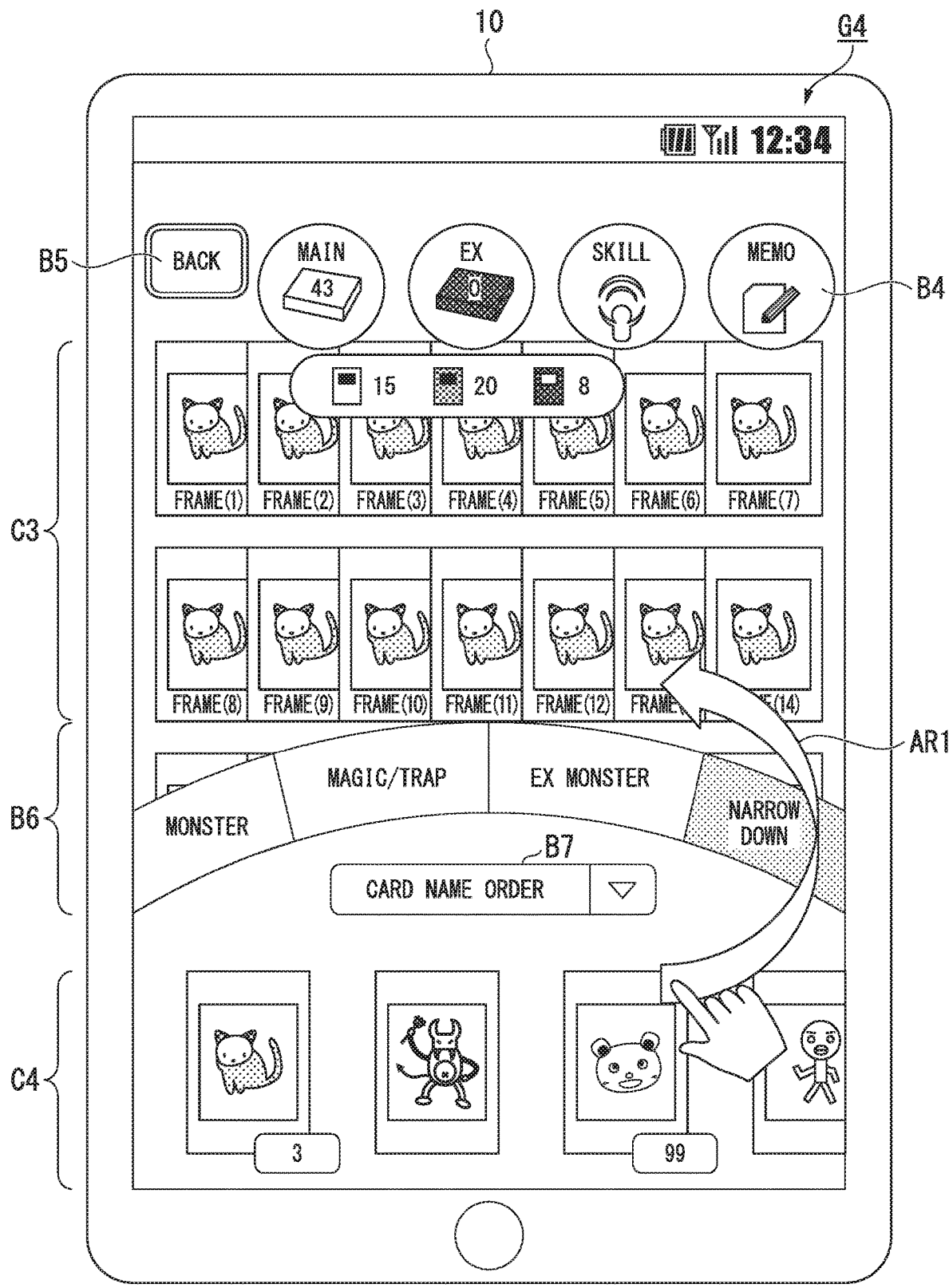
FIG. 14 is a diagram illustrating a first example of a deck editing screen according to the embodiment.

FIG. 14 is a diagram illustrating an example of a deck editing screen.

The deck editing screen is a screen for receiving deck editing operations. In the example illustrated in FIG. 14, cards C3 that construct a deck and user's owned cards C4 are respectively displayed in lists on a deck editing screen G4. The terminal device 10 may temporarily not display the cards C3 that construct the deck or the owned cards C4 in accordance with a sliding operation and the like, for example.

In addition, a memo button B4, a back button B5, an owned card type selecting button B6, and an owned card sorting button B7 are provided on the deck editing screen G4. The memo button B4 is a button for recording a memo as supplementary information of the deck. The back button B5 is a button for returning to previous screen display. If the back button B5 is selected, the terminal device 10 regards the editing as having completed and returns the display to the previous screen, for example. That is, the memo button B4 and the back button B5 are examples of manipulators that receive editing operations. The type selecting button B6 is a button for narrowing down cards to be displayed on the basis of types of the cards. The sorting button B7 is a button for sorting (rearranging) the cards to be displayed.

In a case in which cards that construct the deck are changed, the user may drag and drop an owned card the user desires to add to a display region of the cards that construct the deck as represented by the arrow AR1 in FIG. 14, for example. The terminal device 10 may receive arbitrary operations such as pressing of a button, a touch operation, and a sliding operation, as well as this operation.

Note that although a deck that does not conform to the regulations cannot be used to play the game as described above, the terminal device 10 may save deck information. In addition, in a case in which a deck does not conform to the regulations, the terminal device 10 may notify the user of the fact. Also, in a case in which a posted deck is edited, the terminal device 10 may utilize cards that the user does not own to edit the deck.

In addition, the terminal device 10 may display different deck editing screens in a case in which posted deck information is edited and in a case in which owned deck information is edited. For example, the posted deck is just for a proposal and is not necessarily constructed only by the user's owned card. Thus, the terminal device 10 may display unowned cards in addition to the owned cards in a case in which the posted deck is edited. Then, the terminal device 10 may permit inclusion of unowned cards in the posted deck.

The above is the description of the user interface at the time of editing the deck.

(Step S108) The terminal device 10 receives an editing operation. The terminal device 10 updates deck information in accordance with the editing operation. Thereafter, the game system 1 advances the processing to Step S110.

(Step S110) The terminal device 10 receives inputs of attribute information and supplementary information of the deck. Thereafter, the game system 1 advances the processing to Step S112.

Here, a user interface at the time of inputting attribute information and supplementary information of a deck will be described.

Figure 15:
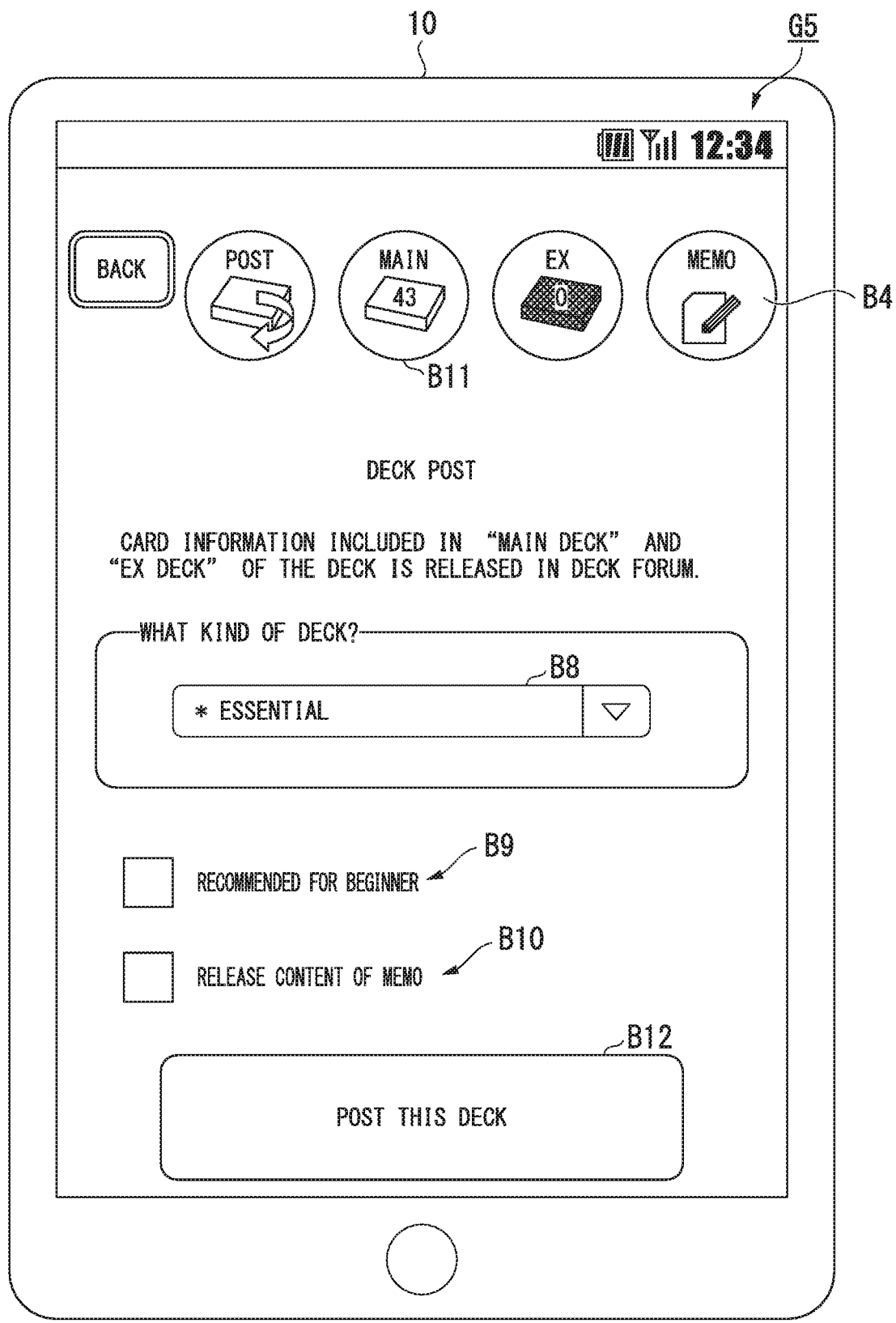
FIG. 15 is a diagram illustrating an example of a deck posting screen according to the embodiment.

FIG. 15 is a diagram, illustrating an example of a deck posting screen.

The deck posting screen is a screen for receiving a deck posting operation. In the example illustrated in FIG. 15, a memo button B4, a deck category selecting button B8, a recommendation button B9, a memo releasing button B10, a deck checking button B11, and a posting button B12 are provided on a deck posting screen G5. The deck category selecting button B8 is a button for registering a category as attribute information. The recommendation button B9 is a button for registering that a deck is a deck recommended by a poster as attribute information. The memo releasing button B10 is a button for setting a memo of supplementary information to be releasable. The deck checking button B11 is a button for causing content of a deck to be displayed and checked. The posting button B12 is a button for causing editing of the deck to be completed and posting deck information and the like. Note that the terminal device 10 may invalidate the posting button B12 such that no posting is allowed in a case in which the deck does not conform to the regulations.

In this manner, the terminal device 10 may receive inputs of the attribute information and the supplementary information of the deck as well as operations via the memo button B4 in FIG. 14 as described above.

The above is the description of the user interface at the time of inputting the attribute information and the supplementary information of the deck.

(Step S112) If content of the editing is fixed, then the terminal device 10 transmits deck information, attribute information, supplementary information and the like after the updating to the server device 30. In other words, in a case in which posted deck information is edited, the terminal device 10 posts the posted deck information and the like. Thereafter, the game system 1 advances the processing to Step S302.

Note that the terminal device 10 determines that the content of editing has been fixed in a case in which the back button B5 illustrated in FIG. 14 is selected or in a case in which the posting button B11 illustrated in FIG. 15 is selected, for example. The terminal device 10 may not transmit deck information to the server device 30 in a case in which the deck information has not been updated at the time of selection of the back button B5. In addition, the terminal device 10 may determine whether or not the deck conforms to the regulations at a timing at which it is determined that the content of editing is fixed, and in a case in which the deck does not conforms to the regulations, the terminal device 10 may notify the user of the fact.

(Step S302) The server device 30 causes the owned deck information storage 342 or the posted deck information storage 343 to store the deck information received from the terminal device 10. In addition, the server device 30 generates posted information on the basis of attribute information and supplementary information of the deck and causes the posted information storage 344 to store the posted information.

Thereafter, the game system 1 ends the processing illustrated in FIG. 12.

The operations of the game system 1 at the time of editing a deck have been described above.

Next, operations of the game system 1 at the time of outputting a deck will be described.

Figure 16:
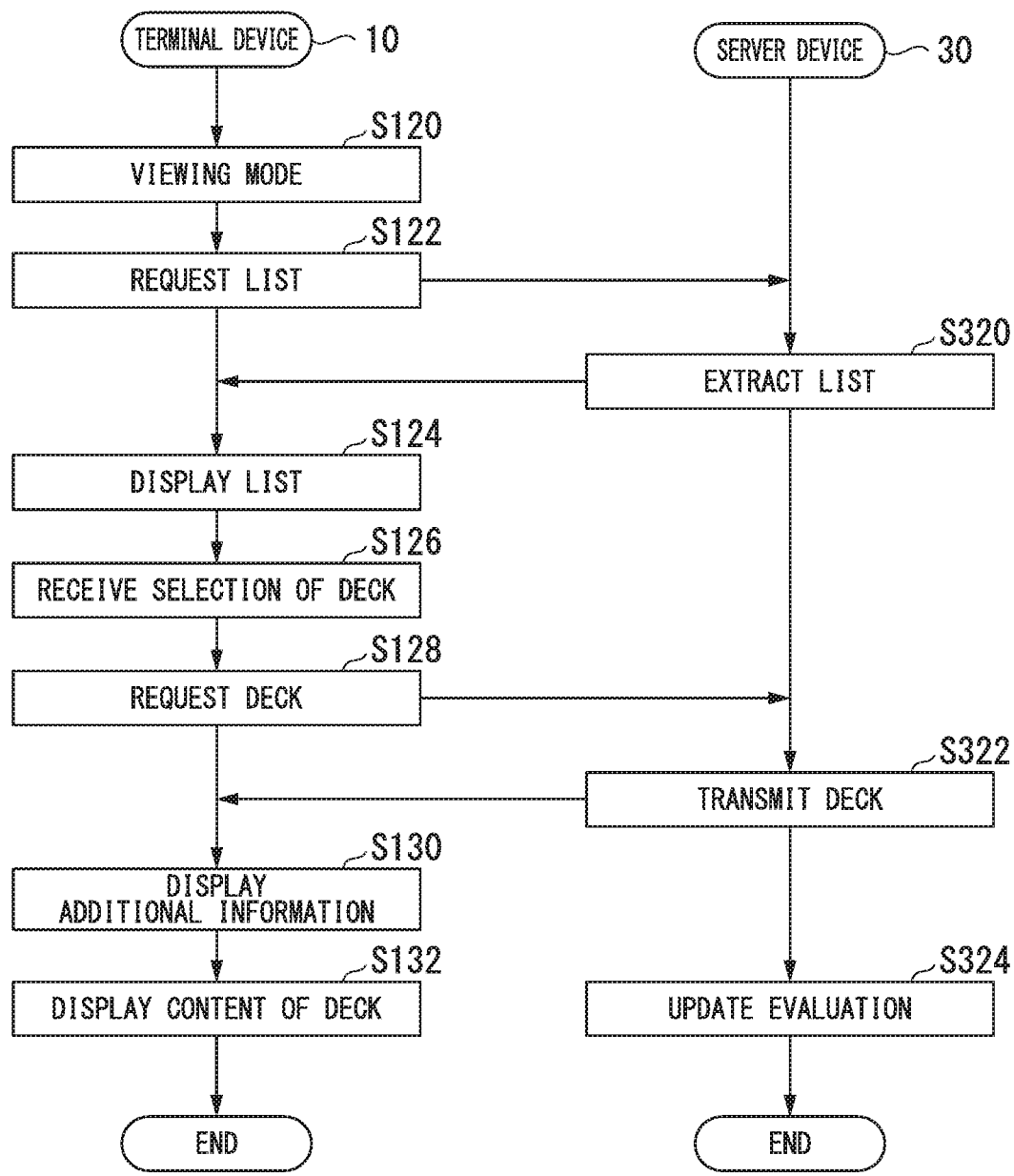
FIG. 16 is a sequence chart illustrating an example of a flow of deck output processing according to the embodiment.

FIG. 16 is a sequence chart illustrating an example of a flow for deck output processing.

(Step S120) The terminal device 10 activates a viewing mode for viewing posted decks. The viewing mode is a mode for displaying posted deck reference information. The viewing mode is activated by an activation operation performed on the game menu screen or by an operation of the posted deck viewing button DB illustrated in FIG. 13, for example. Thereafter, the game system 1 advances the processing to Step S122.

(Step S122) The terminal device 10 requests the server device 30 to transmit a list of posted decks. The terminal device 10 may notify the server device 30 of extraction conditions and sorting conditions. Thereafter, the game system 1 advances the processing to Step S124.

(Step S320) The server device 30 extracts posted information of the posted decks in response to a request from the terminal device 10. The server device 30 transmits the extracted posted information to the terminal device 10. Thereafter, the game system 1 advances the processing to Step S124.

Here, the server device 30 may extract a predetermined number of posted information pieces in a case in which there are a large number of posted information pieces. At this time, the server device 30 may randomly (indiscriminately) extract posted information. In this manner, since the terminal device 10 displays different posted information every time the terminal device 10 accesses the server device 30, different terminal devices 10 display mutually different posted information. That is, the respective users refer to the respectively different posted information. Here, if the respective users refer to the same posted information, a probability at which the same posted deck information is utilized increases. In this case, there is a probability that deployment of the game may become similar and interesting features of the game may deteriorate. Meanwhile, it is possible to secure diversity of decks that the respective users use to play the game if the respective users refer to different posted information. Therefore, the game system 1 can maintain the interesting features of the game.

In addition, the server device 30 may manage the number of times posted decks are viewed and elapsed time after posting of the posted decks. In a case in which the number of times the posted decks are viewed exceeds a predetermined number of times, in a case in which the elapsed time after the posting of the posted decks exceed a predetermined value, and the like, the server device 30 then restricts extraction of posted information of those posted decks. In this manner, the respective users thus refer to different posted information, and it is possible to secure diversity of the decks that the respective users use to play the game. Therefore, the game system 1 can maintain the interesting features of the game.

(Step S124) The terminal device 10 acquires posted information from the server device 30. The terminal device 10 displays a list of posted decks on the basis of the acquired posted information. The terminal device 10 may display the posted decks in a list on the basis of extraction conditions or sorting conditions. Thereafter, the game system 1 advances the processing to Step S126.

Here, a user interface at the time of displaying posted decks in a list will be described.

FIG. 2 is a diagram illustrating an example of a posted deck list screen.

The posted deck list screen is a screen for displaying posted decks in a list. In the example illustrated in FIG. 2, a deck list DL, a sorting button B1, a deck category selecting button B2, a recommendation selecting button B3, and a memo button B4 are provided on the posted deck list screen G1. Evaluation, names, categories, posters, posting dates and times, and the like of the posted decks, and outlines of the posted decks are displayed in the deck list DL. The information is specified by referring to posted information. It is possible to display, in the deck list DL, information about posted decks with low display orders, that is, posted decks that cannot be displayed within the screen, for example, in accordance with a scrolling operation.

The sorting button B1 is a button for changing arrangement of the posted decks in the deck list DL. That is, the sorting button B1 is an example of a manipulator that receives sorting condition designating operations. The category selecting button B2 is a button for designating categories and narrowing down the posted decks to be displayed in the deck list DL. The recommendation selecting button B3 is a button for narrowing down the posted decks to be displayed in the deck list DL only to recommendations of posters. That is, the category selecting button B2 and the recommendation selecting button B3 are examples of manipulators that receive extraction condition designating operations. The terminal device 10 changes display of the deck list DL on the basis of designated conditions and request the server device 30 to transmit posted deck reference information that satisfies the designated conditions.

The above is the description of the user interface at the time of displaying posted decks in a list.

(Step S126) The terminal device 10 receives selection of posted decks from the user. The terminal device 10 may receive operations of selecting any of the posted decks displayed in the deck list DL illustrated in FIG. 2, for example. Thereafter, the game system 1 advances the processing to Step S128.

(Step S128) The terminal device 10 transmits a deck ID of a selected posted deck to the server device 30 and requests the server device 30 to transmit deck information. Thereafter, the game system 1 advances the processing to Step S322.

(Step 322) The server device 30 reads the posted deck information from the posted deck information storage 343 by using the deck ID acquired from the terminal device 10 as a retrieval key. The server device 30 transmits the read posted deck information to the terminal device 10. Thereafter, the game system 1 advances the processing to Step S130 and Step S324.

(Step S324) The server device 30 updates evaluation of the posted deck information transmitted to the terminal device 10. Specifically, the server device 30 reads posted information from the posted information storage 344 by using the deck ID acquired from the terminal device 10 as a retrieval key. The server device 30 updates evaluation information of the read posted information. Specifically, the server device 30 adds or subtract a predetermined value to or from the evaluation score. The evaluation information is one of determination criteria for whether or not other users view the content of the posted deck by attracting or reducing users' interest in the posted deck. Thereafter, the server device 30 ends the processing illustrated in FIG. 16.

(Step S130) The terminal device 10 displays additional information for the selected posted deck. The terminal device 10 may display the additional information on the basis of extraction conditions. Thereafter, the terminal device 10 advances the processing to Step S132. Note that information that is necessary to display the additional information may be acquired in advance at an arbitrary timing during the processing in Step S320, S322, or the like.

Here, a user interface at the time of displaying the additional information will be described.

Figure 17:
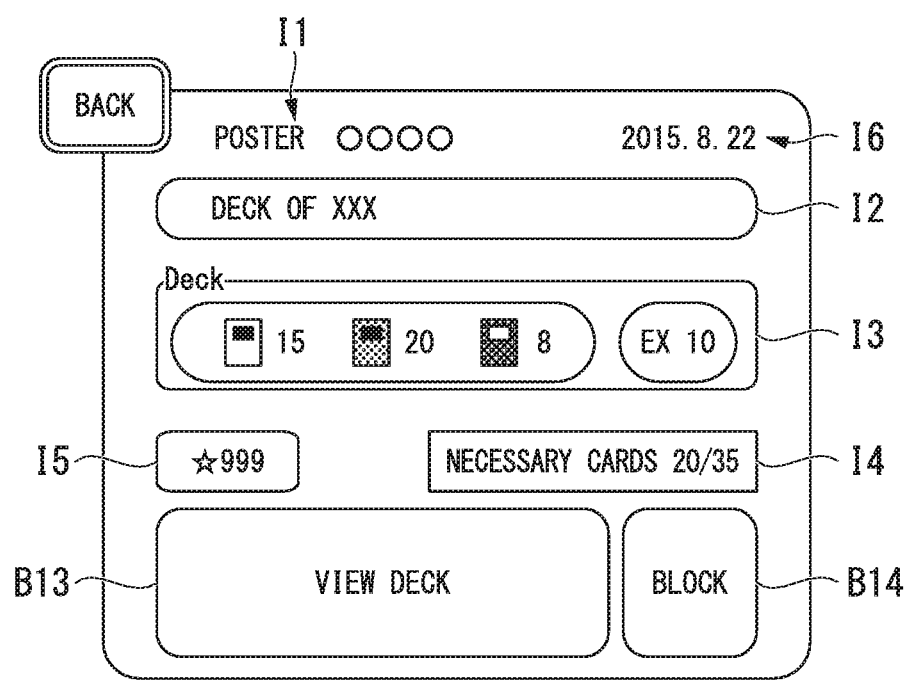
FIG. 17 is a diagram illustrating an example of an additional information screen according to the embodiment.

FIG. 17 is a diagram illustrating an example of an additional information screen.

The additional information screen is a screen for displaying additional information of posted decks. In the example illustrated in FIG. 17, poster name information I1, deck name information I2, card type construction umber information I3, owned card proportion information I4, evaluation information I5, and posting date and time information I6 are displayed on the additional information screen G6. Among them, the poster name information I1, the deck name information I2, the evaluation information I5, and the posting date and time information I6 are information specified on the basis of posted information. The card type construction number information I3 is information indicating the number of cards that construct a posted deck for each card type (for example, monster cards, magic cards, trap cards) and for each level. The card type construction number information I3 may be indicated by proportions (percentages, for example). In this manner, the user can easily determine a balance among the card types. In a case of a user who prefers a deck including specific type of cards, such as magic cards, at a high proportion, for example, the user can easily find a desired poste deck (that is, a posted deck that includes magic cards at a high proportion). The card type construction number information I3 is specified on the basis of the deck information and the card attribute information.

The owned card proportion information I4 is an example of information indicating a proportion of user's owned card with respect to cards that construct a deck and information that is displayed on the basis of extraction conditions. The owned card proportion information I4 is identified through comparison between the respective cards that posted deck information indicates and the respective cards that owned card information indicates. The comparison of the cards is performed by determining whether or not card IDs coincide with each other. Specifically, the number of cards that are present in the owned cards from among the cards that construct a posted deck is counted, and the number of counted cards and the total number of cards that construct the posted deck are shown in a comparative manner. In this manner, the terminal device 10 displays a result of comparison between deck information and the owned cards. In this manner, the user can easily determine whether or not the posted deck can be directly used without editing the posted deck or to what degree the posted deck is close to a state in which the posted deck can be utilized to play the game. Therefore, the user can easily determine whether or not the posted deck is easily utilized by the user himself/herself.

Note that the owned card proportion information I4 may or may not be displayed on the additional information screen. That is, the information about the comparison between the respective cards that the posted deck information indicates and the respective cards that the owned card information indicates may or may not be displayed on the additional information screen.

Note that the terminal device 10 shows a case in which a posted deck is constructed only by user's owned cards and a case in which a posted deck is constructed to include user's unowned cards, in a distinguishable manner. The distinguishing can be performed by determining whether or not cards conform to extraction conditions related to the aforementioned comparison with the owned cards or extraction conditions related to comparison with an owned deck. The case in which a posted deck is constructed only by the user's owned cards and the case in which a posted deck is constructed to include user's unowned cards may be distinguished by differentiating colors, transparency, patterns, and the like of characters and display sections of the owned card proportion information I4, for example, or may be distinguished by displaying an icon only in the case in which a posted deck is constructed only by the user's owned cards. In this manner, the case in which a posted deck is constructed only by the user's owned cards and the case in which a posted deck is constructed to include user's unowned cards may be distinguished in an arbitrary method.

In addition, a deck display button B13 and a block setting button B14 are provided on an additional information screen G6. The deck display button B13 is a button for displaying cards that construct a deck. The block setting button B14 is a button for setting a deck that is being selected as a target to be blocked. If the block setting button B14 is selected, the terminal device 10 notifies the server device 30 of the fact. That is, the block setting button B14 is an example of a manipulator that receives operations for evaluating posted decks. The server device 30 identifies posted information of a posted deck blocked on the basis of the notification and updates evaluation information. Specifically, the server device 30 sums up the number of blocked decks and subtracts a predetermined value from an evaluation score.

The above is the description of the user interface at the time of displaying additional information.

(Step S132) The terminal device 10 receives an operation of displaying content of a posted deck and then displays cards that construct the deck. The terminal device 10 may display the cards that construct the deck on the basis of deck content display conditions. Thereafter, the terminal device 10 ends the processing illustrated in FIG. 16.

Here, a user interface at the time of displaying content of a posted deck will be described.

FIG. 3 is a diagram illustrating an example of a posted deck detail screen.

The posted deck detail screen is a screen that displays the content of the posted deck, that is, cards that construct the posted deck. In the example illustrated in FIG. 3, a card group C1 that construct the posted deck is displayed on a posted deck detail screen G2. In this group, two cards C2 are cards that the user does not own (unowned cards). Here, the terminal device 10 displays the owned cards and unowned cards in a distinguishable form on the basis of deck content display conditions. In the example illustrated in FIG. 3, the terminal device 10 shows x-mark icons such that the icons are overlaid on the unowned cards C2 and displays the unowned cards C2 in a gray-out form. The unowned cards C2 are specified through comparison between the respective cards that posted deck information indicates and respective cards that owned card information indicates. In this manner, the user can easily ascertain cards that the user himself/herself does not own in the posted deck.

Note that the owned cards and the unowned cards may be distinguished by an arbitrary method other than the methods of differentiating the colors of the cards and displaying the icons. Also, the terminal device 10 may display only the owned cards or only the unowned cards or may display the owned cards and the unowned cards in a similar display form. In addition, the terminal device 10 may receive an operation of providing an instruction for switching these display forms from the user. In a case in which the unowned cards are displayed in a less outstanding manner than the owned cards, for example, there is a concern that it becomes difficult to determine content, types, and the like of the unowned cards. In this regard, the terminal device 10 can maintain visibility of the unowned cards while clearly showing a relationship between the cards that construct the posted deck and the owned cards by enabling switching between the card display forms in accordance with user's operations.

In addition, a copy button CP is arranged on the posted deck detail screen. The copy button CP is a button for receiving a copy operation of copying card configurations of the posted deck that is being displayed. The copy button CP is an example of a manipulator that receives editing operations. If the user selects the copy button CP, the terminal device 10 copies deck information such as a card ID or memo information. Here, the copying of the deck information may be performed by temporarily maintaining the deck information in the terminal device 10 or may be performed by linking a user ID of the user who has operated the copy button CP to a post ID and stores the user ID and the post ID in the server device 30. Hereinafter, a case in which the deck information is maintained in the terminal device 10 will be described as an example.

Next, the terminal device 10 activates the editing mode (Step S100) and receives selection of a deck to be edited from the owned deck (Step S102). If the deck to be edited is selected, the terminal device 10 displays the deck editing screen. Here, the terminal device 10 can receive a reproduction (pasting) operation from the user. If the reproduction operation is performed, construction of the cards in the posted deck that has previously been copied and content of a memo are reproduced in the owned deck that is being edited. That is, the copied card ID and memo information are associated with the deck ID of the deck that is being edited. In a case in which a posted deck that is constructed thirty-five cards is recovered in an owned deck that is constructed by forty cards, for example, five cards corresponding to the difference therebetween are also excluded from the deck. Note that the terminal device 10 may omit the user's recovery operation and reproduce the posted deck in the owned deck at a timing at which the owned deck as a destination of the recovery is selected. In this manner, it is possible to enable the editing of the posted deck by reproducing the posted deck on the deck editing screen. That is, the displaying of the posted deck on the editing screen is an example of displaying the posted deck in an editable manner.

Figure 18:
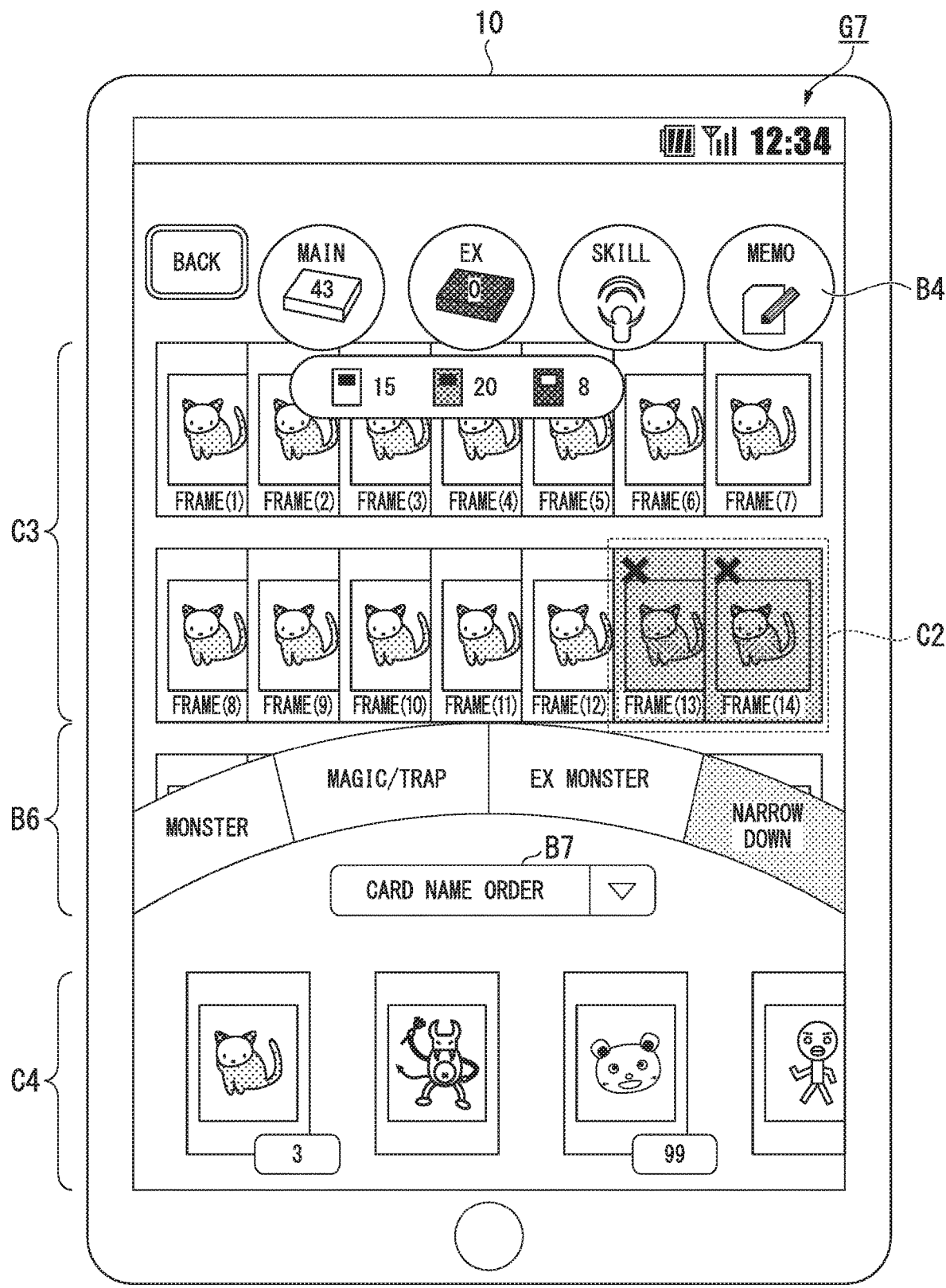
FIG. 18 is a diagram illustrating a second example of the deck editing screen according to the embodiment.

FIG. 18 is a diagram illustrating a second example of the deck editing screen.

In the example illustrated in FIG. 18, a posted deck is reproduced in an owned deck on the deck editing screen. Since the cards C2 are cards that the user does not own, the cards C2 are displayed in a gray out form. That is, the cards C2 are cards that are lacking to use the deck to play the game. The terminal device 10 may present locations at which these lacking cards can be acquired or methods by which the lacking cards can be acquired. In this manner, the user can easily utilize the posted deck since it is easy to replenish the lacking cards. In addition, in a case in which these lacking cards can be obtained, the terminal device 10 may notify the user of the fact.

Note that although the example in which the cards C2 that the user does not own are displayed such that the cards C2 from among the cards that are included in the posted are distinguished (here, gray out display) from the other cards (the cards that the user owns) in the owned deck has been described in the example illustrated in the drawing, the cards C2 that the user does not own may be displayed similarly to the other cards (the cards that the user owns). That is, information about the comparison between the cards that are included in the posted deck and the user's owned cards may or may not displayed on the deck editing screen.

The above is the description of the user interface at the time of displaying content of a posted deck.

Note that the game system 1 may repeatedly execute the processing in Steps S122, S320, and S124. In a case in which the processing in Step S122 is performed first to display a posted deck list G1 on the screen, for example, the terminal device 10 does not designated extraction conditions and sorting conditions. In this case, the server device 30 randomly extracts posted information (Step S320), and the terminal device 10 displays a deck list on the basis of the extracted posted information (Step S126). Next, the terminal device 10 receives designation of extraction conditions or sorting conditions on the posted deck list screen G1 and then transmits the designated extraction conditions or sorting conditions to the server device 30 (Step S124). The server device 30 extracts the posted information again on the basis of the designated extraction conditions or sorts posted information on the basis of the designated sorting conditions (Step S320). Then, the terminal device 10 updates display on the posted deck list screen G1 on the basis of the posted information extracted or sorted by the server device 30 (Step S124). Note that the sorting of the deck list DL based on the sorting conditions may be performed by the terminal device 10.

Note that the game system 1 may return the processing to Step S124 after the processing in Step S130. In addition, the game system 1 may omit the processing in Steps S128, S322, and S130. In this manner, the game system 1 may be able to switch the posted deck list screen, the additional information screen, and the posted deck detail screen in accordance with user's operations or the like.

Hereinafter, extraction conditions or sorting conditions for displaying posted deck reference information in a list, such as a deck list DL, will also be referred to as a first condition. In addition, extraction conditions or deck content display conditions for displaying detailed information about the posted deck selected in the deck list DL on the additional information screen, the posted deck detail screen, or the like will also be referred to as a second condition. The first condition and the second condition may be the same or different from each other.

The first condition and the second condition are conditions about cards that construct the posted deck (that is, objects included in set information), conditions about posted information (that is, information that is associated with and stored with set information), and the like. Specifically, the first condition and the second condition are sorting conditions based on evaluation, extraction conditions based on regulations, extraction conditions based on categories, extraction conditions and deck content display conditions related to comparison with owned cards, and the like.

The operations of the game system 1 at the time of outputting a deck have been described above.

[Outline of Game]

Next, an outline of an example of the game according to the embodiment will be described. The game according to the embodiment proceeds by the user and a competing counterpart alternately performing selection of commands to cause selection of cards and processing related to the cards to be executed. Note that the competing counterpart may be an NPC (Non Player Character) or may be a user who plays the game by another terminal device 10. In addition, in a case in which the selection of commands to cause selection of cards and processing related to the cards to be executed is alternately performed by the user and the competing counterpart, the respective numbers of times may be the same or different from each other. For example, a scheme in which the user and the competing counterpart alternately perform selection one time each or a scheme in which the user performs the selection twice, the competing counterpart then performs the selection in his/her turn three times, and the user then performs the selection may be employed. In addition, the number of times commands are selected is not limited and may be zero.

Here, the commands indicate processing for causing the game to proceed. Processing to be executed is decided by the user selecting a manipulator corresponding to a command when the user is playing the game and selecting cards as a target of execution of processing based on the command corresponding to the selected manipulator. For example, the manipulator corresponding to the command in the game is an option for selecting what kind of processing is to be executed on cards that the user has selected or the cards will select in the near future. Processing to be executed on the selected cards is decided by the user selecting the manipulator corresponding to the command and selecting the cards. Specifically, the user selects the manipulator corresponding to the commands and selecting the cards on which the processing based on the command corresponding to the selected manipulator is to be executed, and the processing based on the command corresponding to the selected manipulator is thus executed on the selected cards, thereby causing the game to proceed. For example, if the user selects a manipulator corresponding to an "inviting" command that is a manipulator corresponding to a command related to processing of arranging a specific card in the "board" and selects a target to be "invited", the selected card is arranged in the board. The "board" is a region in which the user arranges cards.

Note that the executing of the processing based on the command can also be represented as executing the command. In addition, the selecting of a manipulator corresponding to a command can also be represented as selecting the command. In the following description, a command icon corresponding to each command, a pop-up menu in which a list of commands is displayed, and the like function as manipulators corresponding to commands and are displayed on the game screen such that the user can make selection therefrom.

Figure 19:
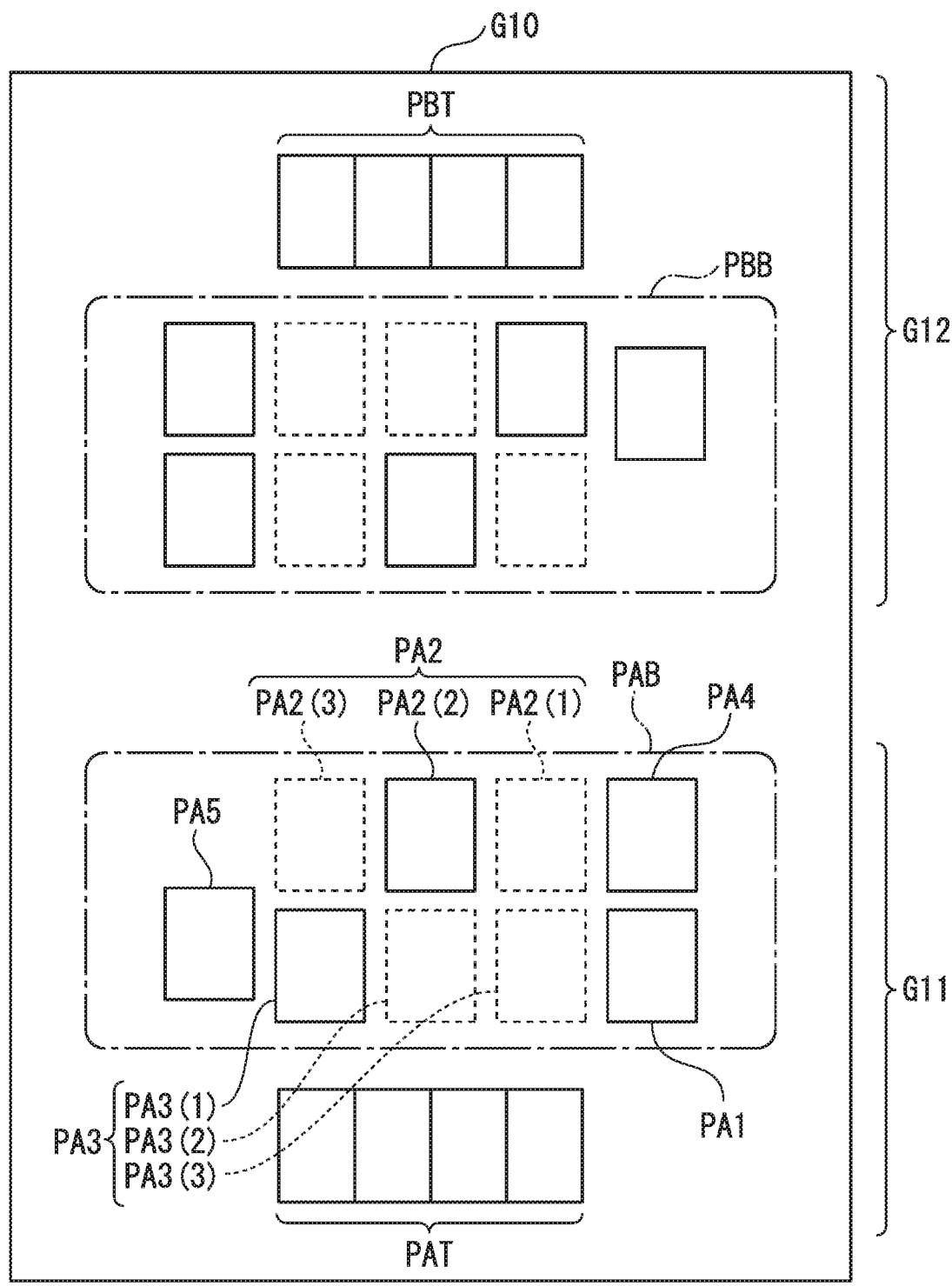
FIG. 19 is a diagram illustrating an example of a game screen for a game according to the embodiment.

FIG. 19 is a diagram illustrating an example of the game screen.

A game screen G10 illustrated in FIG. 19 illustrates an example of the game screen that is displayed on the terminal display device 13 when the game is executed on the terminal device 10. A hand of the user himself/herself that the reference numeral PAT represents (hereinafter, also referred to as his/her own hand PAT) and a board of the user himself/herself that the reference numeral PAB represents (hereinafter, also referred to as his/her own board PAB) are displayed in the lower half region G11 of the game screen G10. Meanwhile, a hand of the competing counterpart that the reference numeral PBT represents (hereinafter, also referred to as the counterpart's hand PBT) and a field of the competing counterpart that the reference numeral PBB represents (hereinafter, also referred to as the counterpart's board PBB) are displayed in the upper half region G12. The his/her own hand PAT and his/her own board PAB and the counterpart's hand PBT and the counterpart's board PBB are displayed in a mutually facing form. His/her own cards and the counterpart's cards are arranged and displayed respectively in his/her own hand PAT and his/her own board PAB and the counterpart's hand PBT and the counterpart's board PBB. Note that the cards being arranged and displayed on the game screen will also simply be referred to as the cards being arranged.

As described above, this game is a turn-based competition game in which the user and the competing counterpart alternately performs selection in the respective turns, and the user selects cards or commands in his/her own turn while the competing counterpart selects cards and commands in the counterpart's turn.

First, the user prepares a deck of an arbitrary combination of owned cards. A plurality of cards included in the deck are placed in a face down manner in a random order and are arranged as a stock in his/her own board PAB. Specifically, the stock is arranged in a region PA1 inside his/her own board PAB. Next, a predetermined number of cards (for example, five cards) that the user picks from the stock in the random order in his/her turn become hands. That is, these hands are an example of objects extracted from the deck. Adding random cards from the stock to the hands in this manner is also referred to as "draw". The hands are arranged in his/her hands PAT. Here, the cards arranged in his/her hands PAT are arranged in a face up manner such that the surfaces on which types and parameters of the cards are described can be visually recognized by the user. Meanwhile, the cards disposed in the counterpart's hands PBT are arranged in a face down manner such that the surfaces of the cards cannot be visually recognized by the user. In addition, it is possible to pick cards one by one from the stock in the second and following his/her turn and to add the cards to his/her hands.

Note that the method of extracting cards from the deck is not limited to the aforementioned method. For example, cards to be extracted from the deck may be randomly decided from among the cards included in the deck. In addition, the game may be a game using all the cards in the deck as hands (a game in which objects are not extracted from set information) or the like, and the objects may or may not be extracted and any method of extracting the objects may be employed in a case of extracting the objects as long as the game is a game that the user plays by combining the objects.

Effects of the cards are caused to work by the user pulling out cards from his/her own hands PAT to his/her own board PAB, and the game proceeds by the user comparing force of the cards pulled out to his/her own board PAB in advance with force of cards in the counterpart's board PBB. Each of the user and the competing counterpart has a predetermined life point (LP: for example, 8000) first and mutually reduces the LP in accordance with predetermined rules on the basis of content of card selection and content of command execution, and one who reduces the LP of the counterpart to zero first is a winner. In this manner, the game according to the embodiment proceeds on the basis of the predetermined rules by using card parameters (for example, life points, offensive ability, and the like) with reference to cards (objects) extracted from the deck.

Note that the pulling out the cards from its own hands PTA to its own board PAB is also referred to as "inviting" here.

Locations at which cards can be arranged in its own board PAB by the "inviting" are defined depending on types of the cards. A region PA2 is a location at which monster cards can be arranged (hereinafter, also referred to as a monster area). The region PA2 includes three regions PA2(1), PA2(2), and PA2(3) in which the monster cards can be arranged one by one, and it is possible to arrange a maximum of three monster cards at the same time. In the example illustrated in the drawing, a monster card is arranged only in the region PA2(2) from among the regions PA2(1), PA2(2), and PA2(3). In addition, the region PA3 is a location at which magic cards and trap cards can be arranged (hereinafter, also referred to as a magic/trap area).

The region PA3 includes three regions PA3(1), PA3(2), and PA3(3) in which magic cards or trap cards can be arranged one by one, and it is possible to arrange a total of three magic cards or trap cards at a maximum at the same time. In the example illustrated in the drawing, a magic card or a trap card is arranged only in the region PA3(3) from among the regions PA3(1), PA3(2), and PA3(3).

In addition, a region PA4 is a location in which monster cards that have been broken by "attacking" commands or magic cards and trap cards after use are arranged (hereinafter, also referred to as a graveyard). In addition, a region PA5 is a location at which cards that can be "specially invited" by a special method are arranged (hereinafter, also referred to as an extra area).

Next, the respective cards will be described. For the monster cards, parameters such as offensive ability that is referred to when processing based on an "attacking" command, which will be described later, is executed and defensive ability that is referred to when the counterpart executes processing based on an "attacking" command are defined. In addition, the monster cards include monster cards that have an effect that it is possible to advantageously advance competition by executing processing based on a "monster effect" command, which will be described later, and monster cards that do not have the effect.

The magic/trap cards cause "effects" of executing specific processing, restricting processing that the competing counterpart is likely to execute, and changing card parameters by executing processing based on "magic/trap" commands, which will be described later. For these cards, effects of various kinds of content and execution conditions are defined depending on types of the cards and types of the effects. Examples of the "effects" include boosting offensive ability of a monster card, adding the top card of the stock to the hand, and restricting command execution of the competing counterpart. Examples of execution conditions include a difference between LPs of the user himself/herself and the competing counterpart and the number of monster cards in the board.

Next, commands that the user uses along with selection of cards will be described. Types of the commands include "inviting", "changing between attacking and defending", "magic/trap", "monster effects", "special inviting", "attacking", and the like.

The "inviting" command is a command related to processing of arranging specific cards in the board. A selected monster card or a monster card to be selected in the near future is arranged in the user's own board PAB by the user executing processing based on the "inviting" command. Note that there is also a case in which an orientation of arrangement, such as vertical orientation, horizontal orientation, face up orientation, and face down orientation, can be selected when the card is arranged. For example, a monster card that is arranged in a face up and vertical orientation can perform attacking. Although the monster card arranged in a face-up and horizontal orientation cannot perform attacking, the LP does not decrease even if the card is attacked by the counterpart. Content of the card arranged in a face down manner is not ascertained by the competing counterpart. For example, arranging a monster card in the board in a face up manner is also referred to as "face-up inviting" while arranging a monster card in a face down manner is also referred to as "face-down inviting".

The "changing between attacking and defending" command is a command of changing orientation (vertical orientation, horizontal orientation, face-up orientation, and face-down orientation) of arrangement of a monster card that is present in the board. Orientation of the selected monster card or the monster card to be selected in the near future is changed when the card is arranged in the user's own board PAB by the user executing processing based on the "changing between attacking and defending" command.

The "magic/trap" command is a command of activating effects associated with the magic and trap cards. "Activating effects" means "executing processing associated with effects". Effects associated with the selected magic/trap cards or magic/trap cards to be selected in the near future are exhibited by the user executing processing based on the "magic/trap" command.

The "monster effect" command is a command of activating predetermined effects associated with monster card cards that have the effects. Predetermined effects associated with the selected monster cards or the monster cards to be selected in the near future are activated by the user executing the processing based on the "monster effect" command.

The "special inviting" command is a command that can be chosen in a case in which an execution condition (a condition associated with each card) that is different from the face-up inviting and the face-down inviting is satisfied and is a command of arranging a monster card in the board.

The "attacking" command is a command of attacking the counterpart by a monster card. The counter part is attacked with the selected monster card or the monster card to be selected in the near future by the user executing processing based on the "attacking" command.

For each of these commands, execution conditions under which the processing based on the commands can be executed in accordance with situations in the game are defined. The situations in the game represent various requirements such as which of a user's turn and a counterpart's turn it is, the respective LPs of the user and the counterpart, the numbers of hands, the remaining numbers of the stocks, the number of monster cards in the boards, the numbers of monster cards in the graveyard, a present "phase" in turn, elapsed from start of turn, and elapsed time from a timing at which it becomes possible to select a command in playing the game. The "phase" is a division in each turn in accordance with rules. The game proceeds by the user's turn and the competing counterpart's turn being alternately repeated, and one turn is constructed by a plurality of phases.

Figure 20:
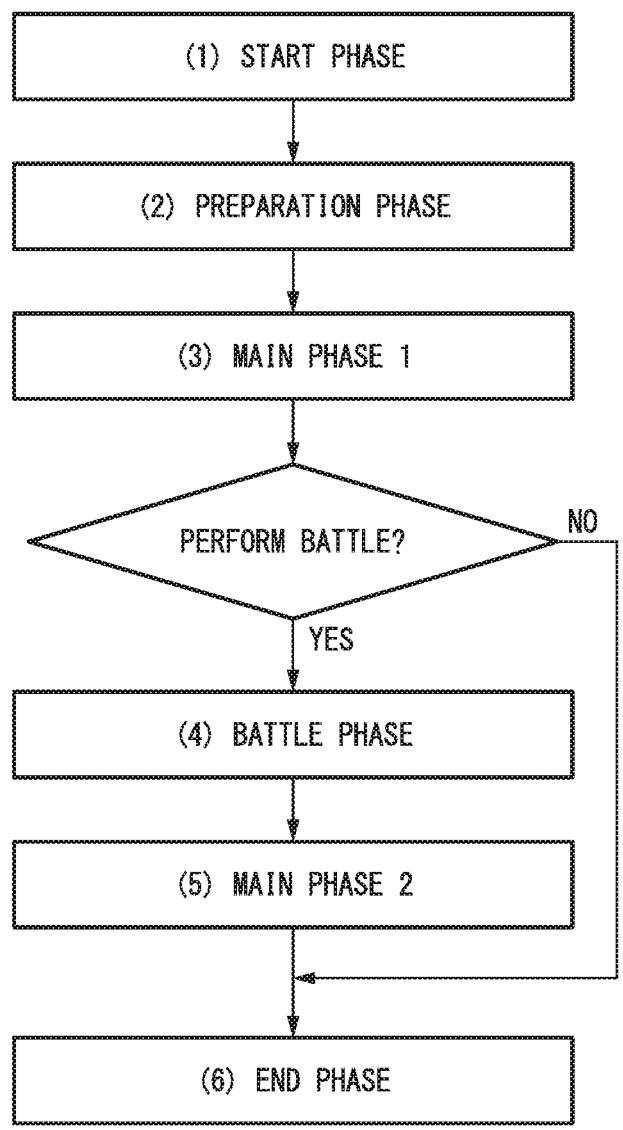
FIG. 20 is a diagram illustrating an example of a flow of a turn of the game according to the embodiment.

FIG. 20 is a diagram illustrating an example of a flow of one turn in which the user plays the game.

For example, one turn proceeds in the order of the respective phases (1) to (6) illustrated in FIG. 20.

(1) Start phase: This is a start of a turn, and processing of pulling out a card from the stock is performed.

(2) Preparation phase: Processing of an effect that automatically occurs at this timing is performed.

(3) Main phase 1: Processing related to activation of an effect by "inviting" of a monster card, "magic/trap", "monster effect" or the like is performed by the user selecting a command and a card.

(4) Battle phase: This is started by a user's operation of performing a battle, a card arranged in the board is used to attack the counterpart, and processing related to a result of the attacking is performed. Note that in a case in which the battle is not performed, this battle phase is not performed and the processing proceeds to the following end phase (6).

(5) Main phase 2: Processing similar to the main phase 1 is performed only in a case in which the battle phase (4) is performed. Note that this phase may be omitted.

(6) End phase: Processing of ending the turn is performed. Thereafter, the processing moves on to the counterpart's turn.

For example, commands such as "inviting" and "changing between attacking and defending" are commands that can be executed only in the main phase. Meanwhile, the "attacking" command is a command that can be executed only in the battle phase. In addition, the conditions under which the respective commands can be executed are defined by other situations in the game other than the phases. For example, the "inviting" command can be executed only in a case in which a monster card is in its own hands PAT and cannot be executed in a case in which there is no monster card. The "changing between attacking and defending" command can be executed in a case in which a monster card is in its own hands PAB and cannot be executed in a case in which there is no monster card. The "monster effect" command can be executed in a case in which a monster card that has an effect is in its own hands PAT or a stock or a graveyard in its own board PAB and cannot be executed in a case in which there is no such a monster card. The "magic/trap" command can be executed in a case in which magic/trap cards are in its own hands PAT or its own board PAB and cannot be executed in a case in which there is no magic/trap cards. The "special inviting" command can be executed in a case in which a monster card that addresses a "special inviting" condition, which cannot be invited by an ordinary method, is in its own hands PAT or its own board PAB (region PA5) and cannot be executed in a case in which there is no such a monster card. The "attacking" command can be executed in a case in which a monster card is in its own board PAB and cannot be executed in a case in which there is no monster card. Also, the "attacking" command can be executed only once in one turn for each monster card. Note that the conditions under which the processing based on these commands can be executed are examples, and various conditions may be defined depending on types of the respective cards, a magnitude relationship between its own LP and a counterpart's LP, which of its own turn or the counterpart's turn it is, and the like.

The above is the description of the outline of the game.

Summary of First Embodiment

In the game system 1 according to the embodiment, the server device 30 includes: the server deck editor 352 that acquires set information associated with a first user (for example, a poster) from a first terminal device 10 (for example, on the posting side) that performs processing of causing a game, which is a game using set information (for example, deck information) indicating a set of objects (for example, cards) that proceeds with reference to objects extracted from the set information (for example, a trading card game), to be executed; the posted deck information storage 343 that stores the set information acquired by the server deck editor 352; the request receiver 351 that receives an output request (for example, an editing request or a transmission request) related to the set information from a second terminal device 10 (for example, on the viewing side) corresponding to a second user; and the server display processing unit 353 that causes the set information corresponding to the output request (for example, an editing request or a display processing request) and/or information related to the set information (for example, posted deck reference information) to be output (for example, stored or transmitted) on the basis of the set information stored in the posted deck information storage 343, as described above.

In this manner, the server device 30 collects set information from the terminal device 10. Then, the server device 30 causes the set information and/or the information related to the set information in accordance with an output request from the terminal device 10. Further, the first terminal device 10 includes a configuration for causing the game to be executed. Therefore, the server device 30 can share the set information and/or the information related to the set information between players of the game via the terminal device 10 with which the game can be performed. Therefore, the server device 30 can prompt the second user to utilize a set of objects proposed by the first user. Then, the server device 30 can prompt the players of the game to communicate with each other.

In addition, the server display processing unit 353 causes the terminal display device 13 to display a plurality of set information pieces corresponding to one output request and/or information related to the set information.

In this manner, the server device 30 causes the plurality of set information pieces and/or the information related to the set information to be displayed at a time. For example, the server device 30 causes names of posted decks to be displayed in a list.

Therefore, the server device 30 makes it easy to retrieve set information. Therefore, the server device 30 can make it easy for the second user to utilize sets of objects proposed by the first user.

In addition, the server deck editor 352 acquires set information associated with each of a plurality of first users from a plurality of first terminal devices 10, and the server display processing unit 353 causes the terminal display device 13 to display set information associated with each of the plurality of first users, which is information corresponding to one output request, and/or information related to the set information lined to each of the plurality of first users.

In this manner, the server device 30 causes the set information and/or the information related to the set information collected from the plurality of first terminal devices 10 to be displayed. Therefore, the server device 30 can make it easy for the second user to utilize sets of objects proposed by the plurality of first users.

In addition, the server device 30 further includes: the posted information storage 344 that stores evaluation information that indicates evaluation of set information; and the evaluation manager 358 that updates the evaluation information on the basis of an evaluation information update request from the second terminal device 10, and the server display processing unit 353 causes set information corresponding to the output request and/or information related to the set information to be displayed on the basis of the evaluation of the set information.

In this manner, the server device 30 causes the set information and/or the information related to the set information to be displayed on the basis of the evaluation of the set information. Therefore, the second user can easily utilize set information that many users have made high evaluation, for example. In addition, the second user can easily exclude set information that many users have made low evaluation, for example. Therefore, the server device 30 can make it easy for the second user to utilize sets of objects proposed by the first users.

In addition, the server display processing unit 353 causes the terminal display device 13 to display all objects indicated by the set information corresponding to the output request.

In this manner, the server device 30 causes all the objects indicated by the set information to be displayed. Therefore, the second user can check all the objects indicated by the set information. Therefore, the second user can directly reproduce content that the first users have edited, for example. In addition, the second user can use the reproduced set of objects to play the game without further editing the set. Therefore, the server device 30 can make it easy for the second user to utilize sets of objects proposed by the first users.

In addition, the server display processing unit 353 causes objects that are associated with the second user and objects that are not associated with the second user in a distinguishable manner from among all objects indicated by the set information corresponding to the output request.

In this manner, the server device 30 make it possible to distinguish whether or not the objects that the set information indicates are associated with the second user. For example, the server device 30 displays which of the objects in the sets of objects that the first users propose the second user owns. Therefore, the server device 30 can make it easy for the second user to utilize sets of objects proposed by the first users.

In addition, the terminal device 10 includes: a terminal game executer 155 that performs control for causing a game, which is a game using set information that indicates a set of objects and proceeds with reference to objects extracted from the set information, to be executed; the terminal deck editor 151 that causes set information, which can be utilized by the terminal game executer 155, to be edited; and the terminal communication unit 11 that transmits information related to the set information edited by the terminal deck editor 151 to the server device 30 and transmits an output request related to the set information to the server device 30.

In this manner, the terminal device 10 causes set information that can be utilized for the game to be edited and transmits the set information to the server device 30. Therefore, a device that is connected to the server device 30 can refer to the set information transmitted from the terminal device 10. That is, since the terminal device 10 make it possible to directly share the set information that can be utilized in the game, it is not necessary to prompt the user to separately edit the set information for sharing the set information. Therefore, the terminal device 10 can reduce burdens on both users on the posting side and users on the viewing side. As described above, the terminal device 10 can make it easy for other users to utilize sets of objects that the user of the device itself proposes.

In addition, the terminal device 10 includes: the terminal game executer 155 that performs control for causing a game, which uses set information that indicates a set of objects and proceeds with reference to objects extracted from the set information, to be executed; the terminal deck editor 151 that causes the set information to be edited; and the terminal display processing unit 152 that causes information related to first set information edited by a first user to be displayed on the basis of a first predetermined condition (for example, an extraction condition or a sorting condition) related to the set information and causes objects, which is indicated by second set information selected by a second user who is different from the first user, in the first set information to be displayed.

In this manner, the terminal device 10 cause information related to a plurality of set information pieces edited by the first user to be displayed. In addition, the terminal device 10 causes objects indicated by the set information selected by the second user to be displayed. That is, the terminal device 10 causes content of the set information edited by the first user to be displayed in response to a demand from the second user. Therefore, the second user can check content of posted decks from display of a list of the posted decks through the terminal with which the second user plays the game, for example. Therefore, the terminal device 10 can make it easy for the second user to utilize sets of the objects proposed by the first user.

In addition, the terminal display processing unit 152 may cause objects that second set information indicates to be displayed in an editable manner.

In this manner, the second user can directly edit the set information edited by the first user via the terminal device 10. That is, the second user can play the game by directly utilizing the set information edited by the first user, that is, without separately performing an operation for reproducing the set information. Therefore, it is not necessary for the second user to newly create a set of objects by operating the terminal device 10 in order to utilize the objects proposed by the first user. Therefore, the terminal device 10 can make it easy for the second user to utilize sets of objects proposed by the first user.

In addition, the terminal display processing unit 152 causes information related to first set information to be displayed on the basis of a predetermined second condition (for example, an extraction condition or a deck content display condition) that is different from the first condition and/or causes objects that the second set information indicates to be displayed on the basis of the second condition.

In this manner, the terminal device 10 causes information related to the first set information and/or the objects that the second set information indicates on the basis of the second condition. Therefore, the second user can utilize not only the first condition but also the second condition for checking the information related to the set information and/or the objects that the second set information indicates. Therefore, the terminal device 10 can make it easy for the second user to utilize sets of objects proposed by the first user by making it easy to find a desired set of objects from among the sets of objects proposed by the first user.

In addition, the second condition is a condition related to comparison between the second set information and the objects associated with the second user, and the terminal display processing unit 152 causes a result of comparison between the plurality of objects that the second set information indicates and the objects associated with the second user to be displayed.

In this manner, the terminal device 10 causes a result of comparison between the objects that the second set information indicates and the objects associated with the second user to be displayed. For example, the terminal device 10 displays to what extent owned objects of the second user are included in the second set information. Therefore, the second user can easily determine whether or not it is possible to utilize a set of objects proposed by the first user can be utilized to play the game or to what extent the set of objects is close to a state in which the set can be utilized to play the game. Therefore, the terminal device 10 can make it easy for the second user to utilize sets of objects proposed by the first user.

In addition, the terminal display processing unit 152 causes objects that are lined to the second user and objects that are not associated with the second user in a distinguishable manner from among the objects that the second set information indicates.

In this manner, the terminal device 10 causes whether or not the objects that the second set information indicates are associated with the second user to be displayed in a distinguishable manner. For example, the terminal device 10 displays objects that are associated with the second user as owned cards and objects that are not associated with the second user as the owned cards in a distinguishable manner. Therefore, the second user can easily check which of the objects that the second set information indicates the second user himself/herself owns. Therefore, the second user can easily determine whether or not a set of objects proposed by the first user can be utilized to play the game or to what extent the set of the objects is close to a state in which the set can be utilized to play the game. That is, the terminal device 10 can make it easy for the second user to utilize sets of objects proposed by the first user.

In addition, the second condition is a condition related to comparison between objects that the first set information indicates and objects associated with the second user, and the terminal display processing unit 152 cause information related to the first set information to be displayed on the basis of the comparison between the objects that each of a plurality of first set information pieces indicates and objects associated with the second user.

In this manner, the terminal device 10 causes the information related to the first set information to be displayed on the basis of a result of comparison with the objects associated with the second user. That is, the terminal device 10 changes information related to the first set information to be displayed, a display form, and the like thereof in accordance with the second user. For example, the terminal device 10 displays a set that is constructed to include a lot of objects that the second user owns. Therefore, the terminal device 10 can cause information related to set information suitable for the second user to be displayed. Therefore, the terminal device 10 can make it easy for the second user to utilize the set information edited by the first user.

In addition, the terminal display processing unit 152 causes the information related to the first set information in mutually different forms in a case in which all the objects that the first set information indicates are lined to the second user and in a case in which at least a part of the objects that the first set information indicates is not associated with the second user.

In this manner, the terminal device 10 causes whether or not all the objects that the first set information indicates are associated with the second user in a distinguishable manner in the display of the information related to the first set information. For example, the terminal device 10 displays a set that is constructed only by objects that the second user owns. Therefore, the second user can easily determine whether or not a set of objects proposed by the first user can be utilized to play the game or to what extent the set of objects is close to a state in which the set of objects can be utilized to play the game. Therefore, the terminal device 10 can make it easy for the second user to utilize the set information edited by the first user.

In addition, the second condition is a condition related to provisions (for example, regulations) of the game, for example, and the terminal game executer 153 causes utilization of set information that does not satisfy the second condition to be restricted.

Specifically, in a case in which the second condition is not satisfied, the terminal deck editor 151 and the server deck editor 352 store the fact. Then, the terminal game executer 153 determines whether or not the fact that the second condition is not satisfied has been stored, and in a case in which the fact that the second condition is not satisfied has been stored, the terminal game executer 153 performs processing of restricting utilization thereof in the game.

In this manner, the terminal device 10 executes the game in accordance with predefined provisions even in a case in which the first user proposes or shares set information that is in the process of creation and does not satisfy the provisions, for example.

In addition, the second condition is a condition related to the provisions of the game, and the terminal deck editor 151 notifies the second user of the fact that the second condition is not satisfied in a case in which the set information that is in the course of editing does not satisfy the second condition.

In this manner, the terminal device 10 provides a notification to the second user in a case in which the set information that is in the course of editing does not conform to the provisions of the game and the like. Therefore, the second user can easily ascertain that it is necessary to edit the set information again to conform the provisions in a case in which the set information edited by the first user does not conform to the provisions of the game.

In addition, the terminal display processing unit 152 causes a result of comparison between objects that the second set information indicates and objects associated with the second user to be displayed.

In this manner, the terminal device 10 causes a result of comparison between the objects that the second set information selected by the second user and the objects associated with the second user to be displayed. For example, the terminal device 10 displays a proportion of the number of objects that the second user owns from among the objects that construct the second set information. Therefore, the second user can easily check to what extent the set information selected by the second user himself/herself is constructed to include objects associated with himself/herself. Therefore, the terminal device 10 can make it easy for the second user to utilize the set information edited by the first user.

In addition, the first condition is a condition related to evaluation about set information, for example, and the evaluation is updated on the basis of an operation that the second user performs after the terminal display processing unit 152 displays objects that the second set information indicates.

In this manner, the terminal device 10 causes the information related to the first set information and/or the objects that the second set information indicates on the basis of evaluation of each set information piece. Here, since the evaluation of the set information is updated by users who are different from the editing user, the set information is objectively evaluated. Then, the second user can utilize the second set information on the basis of this fair evaluation. Therefore, the terminal device 10 can make it easy for the second user to utilize the set information edited by the first user.

In addition, the server device 30 includes: the posted information storage 344 that stores information related to set information; the server display processing unit 353 that extracts information related to first set information from the posted information storage 344 on the basis of a first condition; and the server communication unit 31 that transmits the information related to the first set information to the terminal device 10.

In this manner, the server device 30 transmits the information related to the first set information to the terminal device 10. Therefore, the terminal device 10 can cause the information related to the first set information to be displayed. That is, the server device 30 can provide the information related to the first set information edited by the first user to the second user. Therefore, the server device 30 can make it easy for the second user to utilize the set information edited by the first user.

Second Embodiment

Outline of Second Embodiment

A second embodiment of the present invention will be described. In the embodiment, the same reference numerals will be given to configurations that are similar to those in the aforementioned respective embodiments, and description thereof will be omitted.

A game system 1A according to the embodiment is a system that is for posting decks and viewing and utilizing posted decks similarly to the game system 1. However, the game system 1A is different from the game system 1 in that cards that construct a posted deck can be added as user's owned cards.

The above is the description of the outline of the embodiment.

[Configuration of Game System 1A]

Next, a configuration of the game system 1A will be described.

Figure 21:
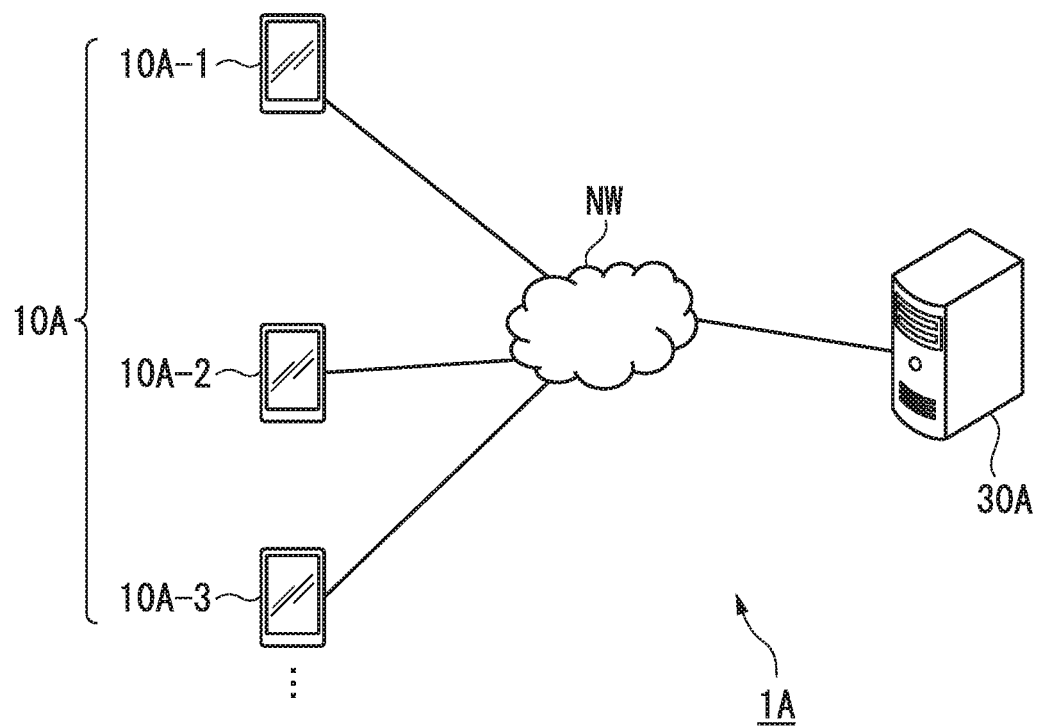
FIG. 21 is a diagram illustrating a configuration of a game system according to a second embodiment of the present invention.

FIG. 21 is a diagram illustrating the configuration of the game system 1A.

The game system 1A includes a terminal device 10A and a server device 30A instead of the terminal device 10 and the server device 30 that the game system 1 includes.

Figure 22:
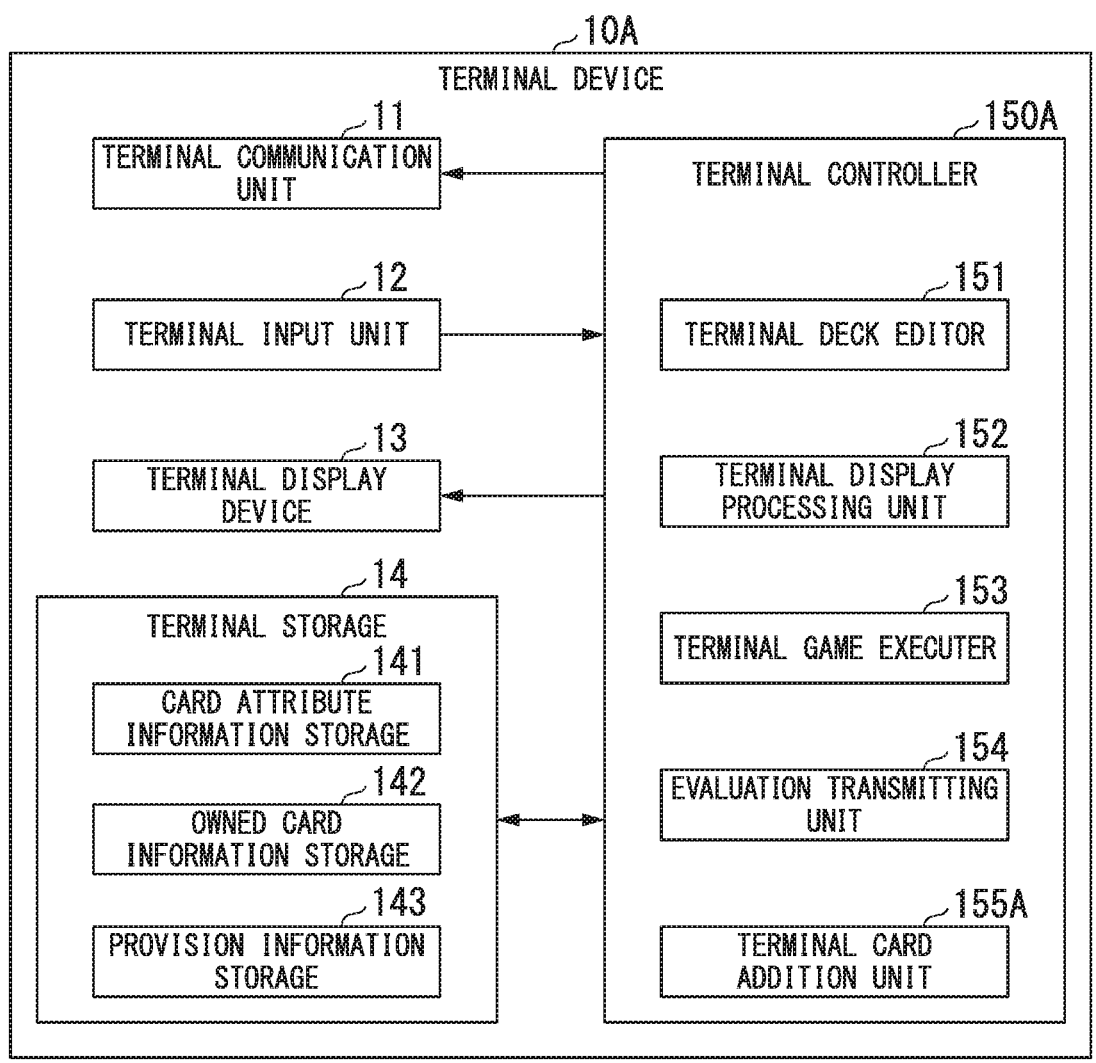
FIG. 22 is a block diagram illustrating a configuration of a terminal device according to the embodiment.

FIG. 22 is a block diagram illustrating the configuration of the terminal device 10A.

The terminal device 10A includes a terminal controller 150A instead of the terminal controller 150. The terminal controller 150A includes a terminal card addition unit 155A in addition to the respective configurations that the terminal controller 150 includes.

The terminal card addition unit 155A executes card addition processing. The card addition processing is processing of adding cards to owned cards in units of decks. In the card addition processing, the terminal card addition unit 155A receives a user's deck addition operation and then reads owned card information from the owned card information storage 142. The deck addition operation may be an operation of selecting the deck addition button AD illustrated in FIG. 13 or an operation of selecting the unowned card C2 illustrated in FIGS. 3 and 18. The terminal card addition unit 155A adds information of cards that construct the added deck to the read owned card information and updates the owned card information. Then, the terminal deck editor 151A causes the owned card information storage 142 to store the owned card information after the updating. In addition, the terminal card addition unit 155A transmits the information of the cards that construct the added deck to the server device 30. In this manner, the owned card information is also updated in the server device 30.

Figure 23:
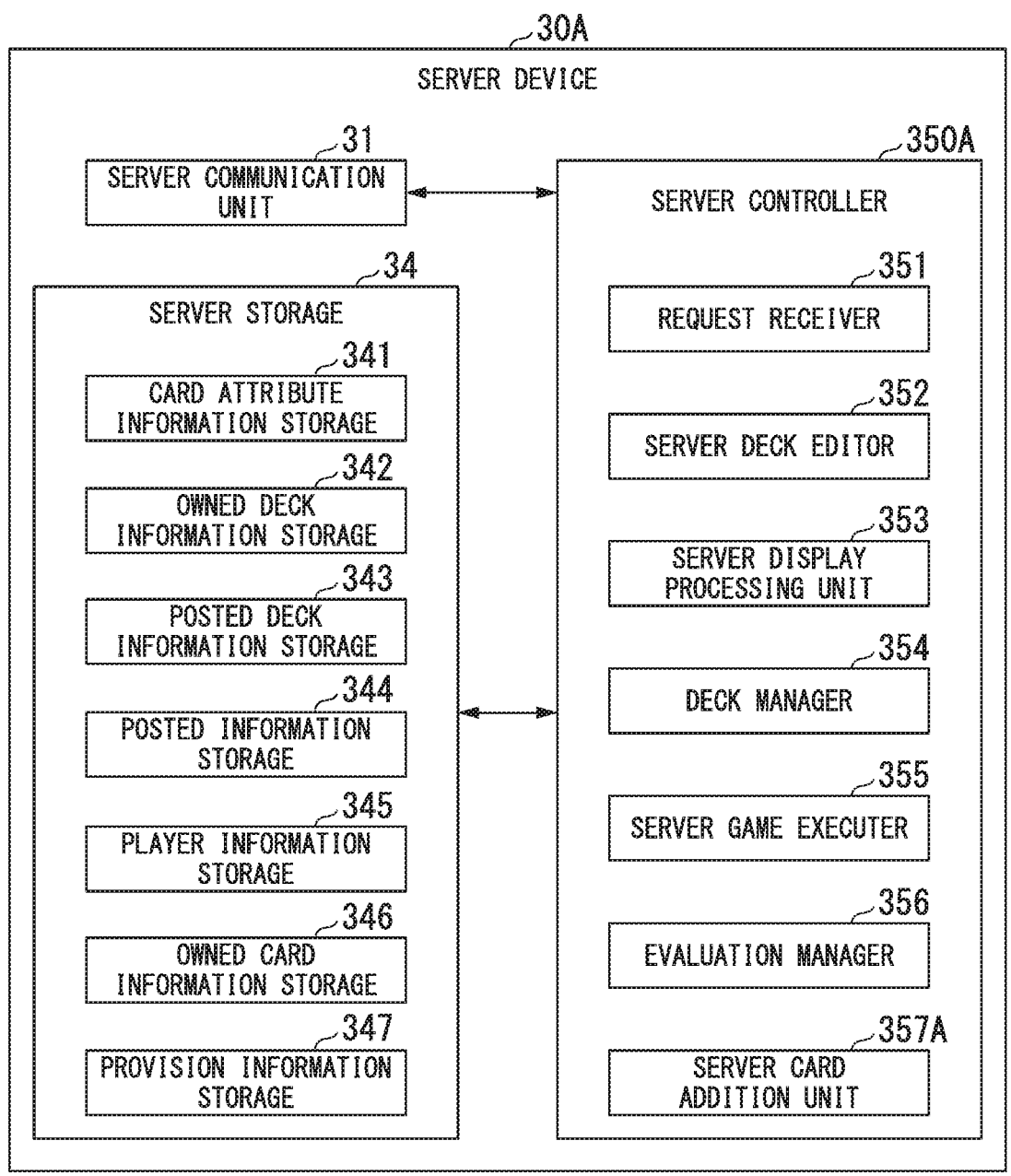
FIG. 23 is a block diagram illustrating a configuration of a server device according to the embodiment.

FIG. 23 is a block diagram illustrating a configuration of the server device 30A.

The server device 30A includes a server controller 350A instead of the server controller 350.

The server controller 350A includes a server card addition unit 357A in addition to the respective configurations that the server controller 350 includes.

The server card addition unit 357A has a configuration corresponding to the terminal card addition unit 155A in the terminal device 10A and executes card addition processing in the server device 30A. The server card addition unit 357A updates owned card information that the owned card information storage 142 stores, on the basis of information of cards that construct the added deck received from the terminal card addition unit 155A.

The above is the description of the configuration of the game system 1B.

Next, an added deck will be described.

The added deck is a set of cards, to which cards that construct the set can be added as user's owned cards. In other words, the added deck is a set of cards that can be added as user's owned cards. The added deck may be a posted deck or may be prepared separately from the posted deck. The added deck can be utilized by being exchanged with consumption of game currency, for example. At the time of utilizing the added deck, the cards that construct the added deck can be registered as user's owned cards, and the content of the added deck can be registered as a user's owned deck. The game system 1B can increase the number of owned cards at a time by adding the cards in units of added decks. Therefore, the game system 1B can make it easy for users who have small numbers of owned cards, in particular, to play the game. In addition, the user can immediately play the game without collecting cards, by using the added deck even in a case in which the user cannot play the game since there are unowned cards in a desired deck.

The added deck may be constructed to include a plurality of same cards (that is, cards with the same card ID). For example, memorizing features of cards becomes burden on users who have less experience in the game in some cases. Thus, if there are a plurality of cards of the same type in the added deck, it becomes easy for the users who have less experience in the game to memorize the features of the cards and to play the game.

In addition, the added deck may be able to be utilized within a predetermined period of time. For example, the period during which the added deck can be utilized may be limited to a predetermined period after first start of the game. Here, it is or may be difficult for users who have just started the game, in particular, to consider content of the deck from limited owned cards. However, since it becomes possible to cover shortage of owned cards and it becomes not necessary to consider content of the deck by utilizing the added deck, it is possible to make it easy to play the game.

In addition, the content of the added deck may be different depending on a timing or a period. Here, the timing at which the added deck is added to the owned deck differs for each user. Therefore, the content of the added deck to be added to each user differs by differentiating the content of the added deck depending on a timing. Therefore, it is possible to prevent the deck of each user from having the same or similar content and to prevent interesting features of the game from deteriorating.

In addition, the amount of cost for utilizing the added deck may be set by a poster or a game operator or may be set in accordance with content (the number of rare cards and the like) of the added deck. It is possible to prevent a situation in which users can get rare and valuable cards at low cost by setting the cost in accordance with the content of the added deck.

In addition, the added deck may be constructed by a lower limit number of cards from among numbers of cards that satisfy the regulations. For example, memorizing features of cards becomes burden on users who have less experience in the game in some cases. Therefore, it is possible to reduce the burden on the user by setting the number of cards to be the lower limit value.

In addition, the added deck may be constructed to include cards that does not exhibit any effect in combination with other cards. In this manner, since the user does not have to memory complicated conditions and the like to utilize the cards, it is possible to reduce the burden on the user.

The above is the description of the added deck.

Modification Examples

Although the embodiments of the present invention have been described above in detail with reference to the drawings, the specific configurations are not limited to the aforementioned embodiments and include designs and the like without departing from the gist of the present invention. For example, the respective configurations described in the aforementioned respective embodiments can be arbitrarily combined. Also, the respective configurations described in the aforementioned respective embodiments can be arbitrarily separated, for example. In addition, the respective configurations described in the aforementioned respective embodiments can be omitted in a case in which the configurations are not necessary to exhibit specific functions, for example. In addition, the respective information pieces described in the aforementioned respective embodiments may be stored in the terminal devices 10 or 10A, the server device 30 or 30A, or another device that is different from the terminal devices 10 and 10A and the server devices 30 and 30A.

In addition, although the form in which both the terminal device 10 or 10A and the server device 30 or 30A manage owned card information has been described in the aforementioned respective embodiments, the present invention is not limited thereto. The owned card information may be managed only by one of the terminal device 10 and the server device 30. However, it is possible to maintain consistency of the owned cards by managing the owned card information by both the terminal device 10 or 10A and the server device 30 or 30A and updating the owned card information by both the terminal device 10 or 10A and the server device 30 or 30A in a case in which the owned card information is updated. For example, it is possible to monitor presence of unfairness by comparing the owned card information respectively managed at a predetermined timing. The timing for comparison may be an arbitrary timing such as before editing the deck, before competition, or at the time of activating the game.

In addition, the content of the game is not limited to the aforementioned content in the aforementioned respective embodiments. For example, virtual characters may advance the game using the deck. Then, the game may be a game in which the user raises characters and advances stories for the respective characters, for example.

An example of a relationship between a user and a deck in a game according to such a modification example will be described.

Figure 24:
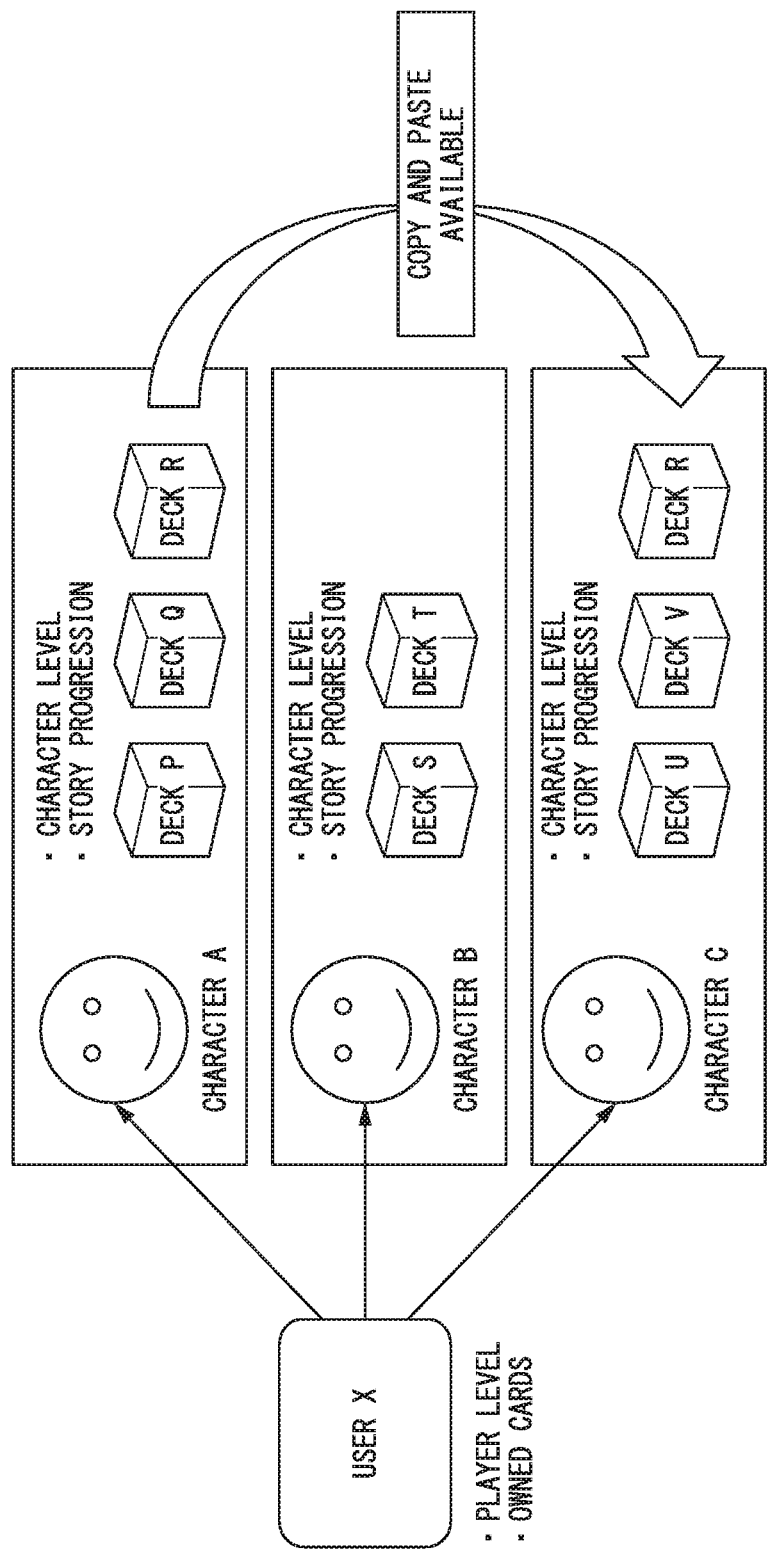
FIG. 24 is a block diagram illustrating a relationship between a user and a deck according to a modification example.

FIG. 24 is a diagram illustrating an example of a relationship between a user and a deck in a game according to a modification example.

In the game according to the modification example, the user (player) has one or more characters and plays the game via these characters. One or more decks are associated with each character. That is, a user's owned deck is associated with and managed with a character ID that identifies the character. Owned cards are associated with the user similar to the aforementioned respective embodiments. The owned cards can be included in owned decks of a plurality of characters. That is, user's owned cards can be shared by the characters.

Here, the game system 1 or 1A according to the modification example may link a deck that has been associated with a certain character to another character. For example, the game system 1 or 1A may change the linkage of deck information in accordance with the aforementioned copying operation (copy) and the reproducing operation (paste). In the example illustrated in FIG. 24, for example, an owned deck "R" of a character "A" is assumed to be an owned deck of a character "C". In this case, the game system 1 or 1A newly links deck information of the deck "R" to a character ID of the character "C". The user can copy his/her own owned deck and regard the copied deck as his/her another owned deck in this manner.

Note that attributes unique to each character may be set for the character. For example, a level for each character, which is different from a player level, may be provided. In addition, cards and commands that can be used may differ depending on each character. For example, there may be a command that can be used only in a case in which a character "A" is selected, or there may be a card that can be used only in a case in which a character "B" is selected. Information that describes whether or not it is possible to use the command or the card is stored in advance in the terminal device 10 or 10A, the server device 30 or 30A, and the like.

In this manner, the game system 1 can determine skills and whether or not it is possible to use cards and can notify the user of the determination results similarly to the aforementioned regulations.

In addition, elements of the game are not limited to those described above in the aforementioned respective embodiments. For example, there may be skills as elements of the game. Here, skills are examples of commands and means performing processing related to the game regardless of cards. For example, the skills include a skill that always exhibits an effect, a skill that exhibits an effect in a case in which a specific condition is satisfied, and a skill that exhibits an effect at an arbitrary timing. More specifically, the skills may include a skill that always changes parameters of cards with specific attributes, a skill that recovers the LP in a case in which its own LP is less than the counterpart's LP by a predetermined value or greater, and a skill that switches cards that are hands in a case in which a player selects activation of the skill. Information that indicates the skills is associated with and stored with the deck ID in the terminal device 10 or 10A, the server device 30 or 30A, and the like. In this manner, arbitrary elements may be added to the game, or arbitrary elements may be deleted or changed.

In addition, a program for realizing the functions of the aforementioned terminal device 10 or 10A and the server device 30 or 30A may be recorded in a computer-readable recording medium, and the program recorded in the recording medium may be read and executed by a computer system, thereby performing the processing of the terminal device 10 or 10A and the server device 30 or 30A. Here, "causing the computer system to read and execute the program recorded in the recording medium" includes installing of the program in the computer system. The "computer system" described here includes hardware such as an OS or a peripheral device. In addition, the "computer system" may include a plurality of computer apparatuses that are connected via a network that includes a communication line, such as the Internet, a WAN, a LAN, or a dedicated line. In addition, the "computer-readable recording medium" means a mobile medium such as a flexible disk, a magneto-optic disk, a ROM, or a CD-ROM and a storage device such as a hard disk incorporated in the computer system. In this manner, the recording medium that stores the program may be a non-transitory recording medium such as a CD-ROM. In addition, the recording medium includes a recording medium provided internally or externally such that the recording medium can be accessed from a distribution server for distributing the program. Codes of the program stored in the recording medium of the distribution server may be different from codes of the program in a format in which the terminal device can execute the program. That is, any format can be employed for the storage in the distribution server as long as it is possible to download the program from the distribution server and to install the distribution server in a form in which the program can be executed in the terminal device. Note that a configuration in which the program is divided into a plurality of parts, and the parts are downloaded at mutually different timings and are then integrated in the terminal device may be employed, or different distribution servers may distribute each divided parts of the program. Further, the "computer-readable recording medium" is assumed to include a recording medium that holds the program for a specific period, such as a volatile memory (RAM) inside the computer system that servers as a server or a client in a case in which the program is transmitted via the network. In addition, the program may be for realizing a part of the aforementioned functions. Further, a program that can realize the aforementioned functions in combination with a program that has already been recorded in the computer system, that is, a so-called differential file (differential program) may be employed.

In addition, a part or entirety of the functions of the aforementioned terminal device 10 or 10A and the server device 30 or 30A may be realized as an integrated circuit such as LSI (Large Scale Integration). The aforementioned respective functions may be individually realized as processors, or a part or entirety thereof may be integrated as a processor. In addition, a method of forming the integrated circuit is not limited to the LSI, and the functions may be realized by a dedicated circuit or a general-purpose processor. In addition, in a case in which a technology of forming an integrated circuit that replaces the LSI appears because of advancement of semiconductor technologies, an integrated circuit using the technologies may be used.

The present invention is ascertained as follows, for example, on the basis of the above description. Note that although the reference numerals in the accompanying drawings will be additionally noted in parentheses for convenience in order to facilitate understanding of the present invention, this does not intend to limit the present invention to the form illustrated in the drawings.

According to an aspect of the present invention, there is provided a server device (30, 30A) including: a set information acquisitor (352, S302) that acquires set information that indicates a set of objects and that is associated with a first user from a first terminal device (10, 10A) that performs processing of causing a game, which uses the set information and proceeds with reference to the objects extracted from the set information, to be executed; a first storage (343) that stores the set information that the set information acquisitor has acquired; a set information request receiver (351, S112, S122, S128) that receives an output request related to the set information from a second terminal device (10, 10A) corresponding to a second user; and an output controller (352, 353, S302, S320, S322) that causes the set information corresponding to the output request and/or information related to the set information on the basis of the set information stored in the first storage.

According to the aforementioned configuration, the server device collects the set information from the first terminal device. Then, the server device causes the set information and/or the information related to the set information to be output in accordance with the output request from the second terminal device. Further, the first terminal device includes a configuration for causing the game to be executed. Therefore, the server device can provide, to the second user, the set information and/or the information related to the set information collected from the first user who actually plays the game. Therefore, the server device can prompt players of the game to communicate with each other and prompt the game to be distributed.

According to another aspect of the present invention, the output controller causes a display device (13) of the second terminal device to display a plurality of set information pieces corresponding to one output request and/or information related to the set information, in the server device according to Appendix A1.

According to the aforementioned configuration, the server device causes the plurality of set information pieces and/or the information related to the set information to be displayed. Therefore, the server device can allow the second user to utilize the plurality of set information pieces and/or the information related to the set information collected from the first user.

According to another aspect of the present invention, the set information acquisitor acquires the set information associated with each of a plurality of first users from a plurality of first terminal devices, and the output controller causes the display device of the second terminal device to display the set information associated with each of the plurality of first users, which is information corresponding to the one output request, and/or the information related to the set information, in the server device according to Appendix A2.

According to the aforementioned configuration, the server device causes the set information and/or the information related to the set information collected from the plurality of first terminal devices to be displayed. Therefore, the server device can allow the second user to utilize the set information and/or the information related to the set information collected from each of the plurality of first users.

According to another aspect of the present invention, the server device according to Appendix 2 or 3, further includes: a second storage (344) that stores evaluation information indicating evaluation of the set information; and an evaluation manager (356, S324) that updates the evaluation information on the basis of an evaluation information update request from the second terminal device, wherein the output controller causes the set information corresponding to the output request and/or the information related to the set information on the basis of evaluation on the set information.

According to the aforementioned configuration, the server device causes the set information and/or the information related to the set information to be displayed on the basis of the evaluation of the set information. Therefore, the second user can utilize the evaluation of the set information in a case in which the second user checks the set information and/or the information related to the set information collected from the first user. Therefore, the server device can make it easy for the second user to utilize the set information and/or the information related to the set information.

According to another aspect of the present invention, the output controller causes the display device of the second terminal device to display all objects that the set information corresponding to the output request indicates, in the server device according to Appendix A1.

According to the aforementioned configuration, the server device causes all the objects that the set information indicates to be displayed. Therefore, the second user can check all the objects that the set information indicates. Therefore, the server device can make it easy for the second user to utilize the set information and/or the information related to the set information.

According to another aspect of the present invention, the output controller causes the object associated with the second user and the objects that are not associated with the second user from among all the objects that the set information corresponding to the output request indicates to be displayed in a distinguishable manner, in the server device according to Appendix A5.

According to the aforementioned configuration, the server device makes it possible to distinguish whether or not the objects that the set information indicates are associated with the second user. Therefore, the second user can check to what extend desired set information includes the object associated with the second user himself/herself. Therefore, the server device can make it easy for the second user to utilize the set information and/or the information related to the set information.

According to another aspect of the present invention, there is provided an information processing apparatus including: a game executer (153) that performs control for causing a game that uses set information indicating a set of objects and proceeds with reference to the objects extracted from the set information to be executed; a set information editor (151) that causes the set information that is available for the game executer to be edited; a set transmission controller (151, S112) that transmits information related to the set information that the set information editor has edited to a server device; and an output request transmission controller (151, 152, S112, S122, S128) that transmits an output request related to the set information to the server device.

According to the aforementioned configuration, the information processing apparatus causes set information that can be utilized in the game to be edited and transmits the set information edited by the apparatus itself to the server device. Therefore, the apparatus capable of accessing the server device can access the set information transmitted from the information processing apparatus. That is, any user who can different from the user of the information processing apparatus can also access the set information.

Therefore, the information processing apparatus can prompt the players of the game to communicate with each other.

According to another aspect of the present invention, there is provided an information processing apparatus (10, 10A) including: a game executer (153) that performs control for causing a game that uses set information indicating a set of objects and proceeds with reference to the objects extracted from the set information to be executed; a set information editor that causes the set information to be edited; a first display processing unit (152, S124, S130) that causes information related to first set information edited by a first user to be displayed on the basis of a first predetermined condition related to the set information; and a second display device (152, S132) that causes the object that second set information selected by a second user who is different from the first user indicates among the first set information to be displayed in an editable manner.

According to the aforementioned configuration, the information processing apparatus causes information related to a plurality of set information pieces edited by the first user to be displayed. In addition, the information processing apparatus causes objects that the set information selected by the second user indicates to be displayed. That is, the information processing apparatus causes content of the set information edited by the first user to be displayed in accordance with a demand from the second user. Therefore, the second user can edit the set information edited by the first user via the information processing apparatus. That is, the second user can play the game by utilizing the set information edited by the first user. Therefore, the information processing apparatus can prompt the players of the game to communicate with each other.

According to another aspect of the present invention, the first display processing unit causes information related to the first set information to be displayed on the basis of a predetermined second condition that is different from the first condition, and/or the second display processing unit causes the objects that the second set information indicates to be displayed on the basis of the second condition, in the information processing apparatus according to Appendix B1.

According to the aforementioned configuration, the information processing apparatus causes the information related to the first set information and/or the objects that the second set information indicates on the basis of the second condition. Therefore, the second user can utilize the second condition in checking the information related to the set information and/or the objects that the second set information indicates. Therefore, the information processing apparatus can make it easy for the second user to utilize the set information edited by the first user and/or the information related to the set information.

According to another aspect of the present invention, the second condition is a condition related to comparison between the second set information and the objects associated with the second user, and the second display processing unit causes a result of the comparison between the plurality of objects that the second set information indicates and the objects associated with the second user to be displayed, in the information processing apparatus according to Appendix B2.

According to the aforementioned configuration, the information processing apparatus causes the result of the comparison between the objects that the second set information indicates and the objects associated with the second user to be displayed. Therefore, the second user can easily determine whether or not the second set information is useful for the second user himself/herself. Therefore, the information processing apparatus can make it easy for the second user to utilize the set information edited by the first user.

According to another aspect of the present invention, the second display processing unit causes the objects that are associated with the second user and the objects that are not associated with the second user from among the plurality of objects that the second set information indicates in a distinguishable manner, in the information processing apparatus according to Appendix B3.

According to the aforementioned configuration, the information processing apparatus causes whether or not the objects that the second set information indicates are associated with the second user to be displayed in a distinguishable manner. Therefore, the second user can check to what extent the second set information is constructed to include the objects associated with the second user himself/herself. Therefore, the information processing apparatus can make it easy for the second user to utilize the set information edited by the first user.

According to another aspect of the present invention, the second condition is a condition related to comparison between the objects that the first set information indicates and the objects that are associated with the second user, and the first display processing unit causes the information related to the first set information to be displayed on the basis of the comparison between the objects that each of the plurality of first set information pieces indicates and the objects that are associated with the second user, in the information processing apparatus according to any of Appendix B2 to Appendix B4.

According to the aforementioned configuration, the information processing apparatus causes the information related to the first set information to be displayed on the basis of the result of the comparison with the objects associated with the second user. That is, the information processing apparatus changes information related to the first set information to be displayed, a display form thereof, and the like in accordance with the second user. Therefore, the information processing apparatus can cause the information related to the set information suitable for the second user to be displayed. Therefore, the information processing apparatus can make it easy for the second user to utilize the set information edited by the first user.

According to another aspect of the present invention, the first display processing unit causes the information related to the first set information in mutually different forms in a case in which all the objects that the first set information indicates are associated with the second user and in a case in which at least a part of the objects that the first set information indicates is not associated with the second user, in the information processing apparatus according to Appendix B5.

According to the aforementioned configuration, the information processing apparatus causes whether or not all the objects that the first set information indicates are associated with the second user, in a distinguishable manner in the display of the information related to the first set information. Therefore, the second user can easily determine whether or not the first set information can be utilized by the second user himself/herself or to what extent the first set information is close to a state in which the first set information can be utilized to play the game. Therefore, the information processing apparatus can make it easy for the second user to utilize the set information edited by the first user.

According to another aspect of the present invention, the second condition is a condition related to provisions of the game, and the game executer causes utilization of set information that does not satisfy the second condition in the game to be restricted, in the information processing apparatus according to any of Appendix B2 to Appendix B6.

According to the aforementioned configuration, the information processing apparatus can cause the information related to the first set information and/or the objects that the second set information indicates on the basis of the provisions of the game that can be executed via the apparatus itself. That is, the information processing apparatus can change the display of the information related to the first set information and/or the objects that the second set information indicates in accordance with relationships with the provisions of the game, such as conformity or the like to the provisions of the game. Therefore, the second user can easily determine whether or not the set information edited by the first user can be utilized in the game that the second user desires to play or to what extent the set information is closed to a state in which the set information can be utilized to play the game. Then, the information processing apparatus can support editing of the set information such that the set information conforms to the provisions of the game. Therefore, the information processing apparatus can make it easy for the second user to utilize the set information edited by the first user.

According to another aspect of the present invention, the second condition is a condition related to the provisions of the game, and the set information editor notifies the second user of the fact that the second condition is not satisfied in a case in which the set information that is being edited does not satisfy the second condition, in the information processing apparatus according to any of Appendix B2 to Appendix B7.

According to the aforementioned configuration, in the case in which the set information that is being edited does not conform to the provisions of the game, and the like, the information processing apparatus notifies the second user of the fact. Therefore, the second user can easily utilize the set information edited by the first user in the game even in a case in which the set information does not conform to the provisions of the game. Therefore, the information processing apparatus can make it easy for the second user to utilize the set information edited by the first user.

According to another aspect of the present invention, the information processing apparatus according to any of Appendix B1 to Appendix B8 further includes: a third display processing unit (152, S130) that causes a result of comparison between the objects that the second set information indicates and the objects that are associated with the second user.

According to the aforementioned configuration, the information processing apparatus causes the result of comparison between the objects that the second set information selected by the second user indicates and the objects that are associated with the second user to be displayed. Therefore, the second user can easily check to what extent that the set information selected by the second user himself/herself is constructed to include the objects that are associated with the second user himself/herself. Therefore, the information processing apparatus can make it easy for the second user to utilize the set information edited by the first user.

According to another aspect of the present invention, the first condition is a condition related to evaluation of the set information, and the evaluation is updated on the basis of an operation performed by the second user after the second display processing unit displays the objects that the second set information indicates, in the information processing apparatus according to any of Appendix B1 to Appendix B9.

According to the aforementioned configuration, the information processing apparatus causes the information related to the first set information and/or the objects that the second set information indicates on the basis of the evaluation of each set information piece. Here, this evaluation is updated on the basis of the operation of the second user who is different from the first user who has edited the first set information and the second set information. That is, since the evaluation of the set information is updated by the user who is different from the user who has edited the information, the set information is relatively fairly evaluated. Then, the second user can utilize the second set information on the basis of the fair evaluation. Therefore, the information processing apparatus can make it easy for the second user to utilize the set information edited by the first user.

According to another aspect of the present invention, there is provided a server device that communicates with the information processing apparatus according to any of Appendix B1 to Appendix B10, the server device including: a storage (343, 344) that stores information related to the set information, an extraction unit (353, S320) that extracts the information related to the first set information from the storage on the basis of the first condition, and a transmitter (31, S320) that is caused to transmit the information related to the first set information to the information processing apparatus According to the aforementioned configuration, the server device transmits the information related to the first set information to the information processing apparatus. Therefore, the information processing apparatus can cause the information related to the first set information to be displayed. That is, the server device can provide the information related to the first set information edited by the first user to the second user. Therefore, the server device can make it easy for the second user to utilize the set information edited by the first user.

According to another aspect of the present invention, there is provided a program that causes a computer to function as the server device (30, 30A) or the information processing apparatus (10, 10A) according to any of Appendix A1 to Appendix A7 or Appendix B1 to Appendix B12.

According to the aforementioned configuration, the program can make it easy to utilize sets of objects that other persons propose in the game since the program causes the computer to function as the server device or the information processing apparatus according to Appendix A1 to Appendix A7 or Appendix B1 to Appendix B12.

REFERENCE SIGNS LIST

1, 1A Game system
10, 10A Terminal device
30, 30A Server device
11 Terminal communication unit
12 Terminal input unit
13 Terminal display device
14 Terminal storage
141 Card attribute information storage
142 Owned card information storage
143 Provision information storage
150, 150A Terminal controller
151 Terminal deck editor
152 Terminal display processing unit
153 Terminal game executer
154 Evaluation transmitting unit
155A Terminal card addition unit
31 Server communication unit
34 Server storage
341 Card attribute information storage
342 Owned deck information storage
343 Posted deck information storage
344 Posted information storage
345 Player information storage
346 Owned card information storage
347 Provision information storage
350, 350A Server controller
351 Request receiver
352 Server deck editor
353 Server display processing unit
354 Deck manager
355 Server game executer
356 Evaluation manager
357A Server card addition unit

What is claimed is:

1. A server device comprising:
   a set information acquisitor configured to acquire a set information from a first terminal device, wherein the set information indicates a set of objects and the set information is associated with a first user, the first terminal device is configured to process a game by using the set information and to proceed with reference to the set of objects extracted from the set information;
   a first storage that stores the set information that the set information acquisitor has acquired;
   a second storage that stores a provision information that indicates regulations, wherein the set information that does not satisfy the regulations cannot be used to play the game;
   a set information request receiver configured to receive an output request related to the set information from a second terminal device corresponding to a second user; and
   an output controller configured to cause, on the basis of the set information stored in the first storage, an output device to output at least one of the set information corresponding to the output request and information related to the set information, wherein the server device is configured to perform control for causing the game to proceed in accordance with user's operations;

wherein the server device is configured to manage the set information;

wherein the server device is configured to receive a request from a second terminal device different from the first terminal, wherein the server device is configured to output, in response to the request from the second terminal, to the second terminal, at least one of the set information that the server device manages and an attribute of the set information.

2. The server device according to claim 1, wherein the output device comprises a display device of the second terminal device, and wherein the output controller is configured to causes the display device of the second terminal device to display a plurality of set information pieces corresponding to at least one of a single output request and information related to the set information.

3. The server device according to claim 2, wherein the set information acquisitor is configured to acquire the set information associated with each of a plurality of first users from a plurality of first terminal devices, and wherein the output controller is configured to cause the display device of the second terminal device to display the set information associated with each of the plurality of first users, which is information corresponding to the one output request, and/or the information related to the set information.

4. The server device according to claim 2, further comprising:

a second storage that stores evaluation information indicating evaluation of the set information; and an evaluation manager configured to update the evaluation information on the basis of an evaluation information update request from the second terminal device, wherein the output controller configured to cause the set information corresponding to the output request and/or the information related to the set information to be displayed on the basis of evaluation of the set information.

5. The server device according to claim 1, wherein the output controller is configured to cause the display device of the second terminal device to display all objects that the set information corresponding to the output request indicates.

6. The server device according to claim 5, wherein the output controller is configured to cause the object associated with the second user and the objects that are not associated with the second user to be displayed in a distinguishable manner from among all the objects that the set information corresponding to the output request indicates.

* * * * *